United States Patent
Castro Rosas et al.

(10) Patent No.: US 11,229,224 B2
(45) Date of Patent: Jan. 25, 2022

(54) PHYTOCHEMICAL COMPOSITIONS USED AS DISINFECTANTS AND FOOD PRESERVATIVES

(71) Applicant: UNIVERSIDAD AUTONOMA DEL ESTADO DE HILDAGO, Pachuca (MX)

(72) Inventors: Javier Castro Rosas, Pachuca de Soto (MX); Carlos Alberto Gomez Aldapa, Pachuca de Soto (MX); Jose Roberto Villagomez Ibarra, Pachuca de Soto (MX)

(73) Assignee: Universidad Autonoma del Estado de Hidalgo, Pachuca (MX)

( * ) Notice: Subject to any disclaimer, the term of this patent is extended or adjusted under 35 U.S.C. 154(b) by 0 days.

(21) Appl. No.: 16/998,148

(22) Filed: Aug. 20, 2020

(65) Prior Publication Data

US 2020/0375227 A1  Dec. 3, 2020

Related U.S. Application Data (62) Division of application No. 14/405,740, filed as application No. PCT/MX2013/000066 on May 17, 2013, now Pat. No. 10,966,443.

(30) Foreign Application Priority Data

Jun. 4, 2012 (MX) .................... MX/a/2012/006393

(51) Int. Cl.
| | |
|---|---|
| *A61K 36/00* | (2006.01) |
| *A23L 3/3463* | (2006.01) |
| *A23L 3/3472* | (2006.01) |
| *A23L 3/358* | (2006.01) |
| *A23L 3/3508* | (2006.01) |
| *A01N 37/02* | (2006.01) |
| *A01N 59/00* | (2006.01) |
| *A01N 65/08* | (2009.01) |

(52) U.S. Cl.
CPC .......... *A23L 3/34635* (2013.01); *A01N 37/02* (2013.01); *A01N 59/00* (2013.01); *A01N 65/08* (2013.01); *A23L 3/3472* (2013.01); *A23L 3/358* (2013.01); *A23L 3/3508* (2013.01); *A23V 2002/00* (2013.01); *Y02A 40/90* (2018.01)

(58) Field of Classification Search
None
See application file for complete search history.

*Primary Examiner* — Russell G Fiebig
(74) *Attorney, Agent, or Firm* — Defillo & Associates, Inc; Evelyn A Defillo (57) ABSTRACT

The present invention describes compositions for disinfection and/or effective preservation of food, for example fresh food, which allows the effective removal of microorganisms from these. The disclosed compositions contain derived extracts from plants with antimicrobial activity, which can act on their own or in combination with other disinfecting agents such as organic acids and chlorine compounds. The compositions of the invention are able to remove microbial contamination, including pathogenic microorganisms in seeds and sprouts obtained therefrom without changing the germination properties and nutritional and/or alimentary properties of the sprouts.

1 Claim, 1 Drawing Sheet

Figure 1. Soybean seeds with water

Figure 2. Seeds treated with vegetal extract

Figure 3. Seeds treated with 100 ppm hypochlorite

Figure 4. Seeds treated with 10,000 ppm hypochlorite

Figure 5. Seeds treated with 0.1% acetic acid

Figure 6. Seeds treated with 100 ppm hypochlorite and 0.1% acetic acid

PHYTOCHEMICAL COMPOSITIONS USED AS DISINFECTANTS AND FOOD PRESERVATIVES

CROSS REFERENCE TO RELATED APPLICATION

This is a divisional of U.S. patent application Ser. No. 14/405,740 filed on May 18, 2015 now allowed, which a national stage entry of PCT/MX2013/000066 filed May 17, 2013 under the International Convention claiming priority over Mexican Patent Application No. MX/a/2012/006393, all of which are incorporated by reference in their entirety.

FIELD OF THE INVENTION

This invention refers to the development of compositions comprising phytochemicals contained in plant extracts and employed as food disinfectants and preservatives, for instance, food from animal and vegetable origin. Particularly, this invention refers to aqueous formulations based on hibiscus calyx extracts (*Hibiscus sabdariffa* L), The method by which it is obtained is also described, as well as its uses as an effective formulation to eliminate pathogenic bacteria from food such as seeds.

BACKGROUND OF THE INVENTION

In developing countries, diseases transmitted by food (DTF) represent one of the most important issues regarding public health (Kumate and Isibasi, 1986; Kumate, 1988). DTFs result from a food's lack of innocuousness. This causes outbreaks, mainly of bacterial origin (Archer and Kvenberg, 1985). Vegetables represent an important source of microorganisms. Some of these display pathogenicity towards both humans and animals (Fernández, 2000). Based on this, from earlier times, decrease or elimination of microorganisms has been sought through the use of disinfectants. In spite of advances made in other areas, such as medicine and technology, the diseases associated with food intake still affect most of the world. Worth mentioning within these is those of bacterial origin (Roller, 2003). For instance, in the United States the estimated yearly incidence of diseases produced by food is around 76 million cases, resulting in 325,000 hospitalizations and 5,000 deaths. In England, there are an estimated 76 million cases of infectious intestinal diseases per year, of which only 1.5 million seek medical care (Roller, 2003). The estimated number of cases in Mexico is over 300 million per year (Fernández, 2000). Recently, fresh fruits and vegetables have been involved in numerous disease outbreaks. Epidemiologic studies of these demonstrate the role of fruits and vegetables as pathogen carriers, considered with special interest in the innocuity of minimally processed vegetables to *E. coli* O157:H7, *L. monocytogenes, C. botulinurn, Shigella, Salmonella*, parasites and virus (Brackett, 1992).

Microorganisms access food through several sources and mechanisms, they can simply survive in them without displaying apparent modifications to the sensory attributes of food, Eventually, sublethal adverse modifications regarding acidity, low or high temperatures, and desiccation, among others, affect the microbial proliferative capacity in food. Once favorable conditions are met (e.g., rehydrating powder milk, defrosting fish), microbial growth is possible if the ecological factors are appropriate. The consequences might be progressive deterioration of food or increased health risk after its consumption (Fernández, 2000). Microorganisms of sanitary interest in food normally include bacteria, fungi, yeast, protozoans, microscopic parasites or both of their egg or larva stages, and some microscopic algae (Fernández, 2000). Specifically in regard to bacteria, indicator microorganisms of sanitary interest include pathogens to humans and those that contribute to food deterioration.

Riley et al. (1983) described and linked enterohemorrhagic *E. coli* (EHEC) to outbreaks characterized by abdominal pain, aqueous diarrhea with blood, and mild fever. This set of symptoms was termed hemorrhagic colitis (HC) and they are caused by ingesting raw or poorly cooked meat. The bacteria isolated in all cases was *E. coli* serotype O157:H7. Karmali in 1983 linked it with isolated cases of uremic hemolytic syndrome (UHS) characterized by acute kidney damage, thrombocytopenia and microangiopathic hemolytic anemia, preceded by bloody diarrhea. In stools from these cases an *E. coli* strain was found that was capable of producing a cytotoxin that displayed activity on Vero cell lines, hence its name "verotoxin" (VT). The strains able to produce this toxin are denominated verotoxigenic *E. coil* (VTEC) (Rodríguez-Ángeles, 2002). This *E. coli* serotype displays an attractive growth between 30 and 41° C. (Doyle and Shoeni, 1984), it survives freezing and ultrafreezing and, unlike other pathogens, it slowly grows at 6° C. in both meat and raw milk. This serotype survives both the fermentation and drying processes in sausages (Glass et al., 1992). When food is kept at low temperatures, its tolerance to acidic environments is more evident. For instance, in apple cider this germ survives less than 3 days at 25° C., but up to 31 days at 8° C. (Zhao et al., 1993).

*E. coli* O157:H7 can be found in bovines, goats, sheep, and less frequently in pigs and chickens, although their main reservoir is the intestine of bovine cattle, The microorganism has also been isolated from fruits and vegetables such as lettuce, radish, alfalfa, and from other commercial products such as mayonnaise and non-pasteurized orange and apple juices. Even if these foods have a pH value of 3.4, this bacteria is able to survive for several days in such conditions (Rodríguez-Ángeles, 2002). *E. coli* O157:H7 is transmitted through ingestion of raw or poorly cooked meat, raw milk or contaminated water. Transmission also occurs between individuals or as a consequence of food handling. Some studies suggest the importance of the domestic fly as a factor in the *E. coli* O157:H7 transmission process (Rodríguez-Ángeles, 2002).

*Salmonella* sp is a typical Gram-negative rod from the Enterobacteriaceae family. They are generally mobile, aerobes, or facultative anarobes (Fernández, 2000). *Salmonella* sp grows well at room temperature even if its optimal growth temperature is approximately 37° C. Its pH growth range is between 4,1 and 9.0. Their minimal growth $a_w$ is variable depending on the food, although it is approximately 0.93-0.95 (Frazier and Westhoff, 1993).

In *Salmonella* sp outbreaks there are a several types of food implicated. Different types of meat are frequently implicated, for instance poultry and its derivatives, especially if they are kept without freezing for a long time. Fresh meat might contain bacteria of the *Salmonella* genus that previously caused a disease in the sacrificed animals, or they were acquired during its handling. Milk and dairy products, including fresh milk, fermented milk, ice cream and cheese, have been known to cause *Salmonella* infections (Frazier and Westhoff, 1993). Chicken eggs are a prominent carrier during salmonellosis transmission (Doyle and Ellin, 2000). Vegetables grown in soil irrigated with sewage water, or grown near breeding or domestic animals, or those that are fertilized with animal wastes, are frequently contaminated with pathogenic agents, including *Salmonella* sp. Foods used for animal breeding are an especially significant link in the *Salmonella* cycle. Several of them are obtained from co-products of animal origin (fish meal, feathers, bones, viscera and blood) that generally contain high amounts of pathogenic microorganisms (Morehouse and Wedman, 1961). Bivalve mollusks and other seafood are contaminated with *Salmonella* because of the pollution from residual waters and coastal waters in which these organisms grow (Mossel and Moreno, 2003). Similarly, some foods containing several *Salmonella* serotypes can cause the consumer salmonellosis (Mossel and Moreno, 2003). The main symptoms of this gastrointestinal infection are: nausea, vomit, abdominal pain and sudden diarrhea (Frazier and Westhoff, 1993).

Theoretically, any fruit or vegetable might be a carrier of pathogenic bacteria, virus and parasites. Fresh fruits and vegetables are susceptible to microbial attack after harvest because of the loss of their natural resistance and their high content of both water and nutrients (Roller, 2003). Exposed plant surfaces are contaminated by soil, water, residual waters, air and animals, thus microorganisms carried by all of these agents are incorporated as flora. Microorganisms contributed by these contamination sources include pathogens and both primary and opportunist deteriorating agents. From raw vegetables it is possible to recover a wide diversity of pathogenic bacteria. For instance, enteropathogens are more frequent in those grown in land exposed to evident fecal contamination. When contaminated vegetables are not handled with the appropriate hygiene procedures, raw products derived from them might contain pathogenic microorganisms or high amounts of microorganisms derived from feces. Recently, Castro-Rosas et al. (2006) analyzed 170 samples of raw vegetable salads and showed that most of them exhibited high microorganism levels, well above the limits allowed by the sanitary laws in Mexico. Only 9 salad samples were within the limits allowed by this legislation. The survival of intestinal microorganisms in vegetables is high enough to become an important health hazard to the population sector that consumes them in raw forms (Fernández, 2000). Pathogens such as *L. monocytogenes* and *Salmonella* sp survive and even multiply outside tomatoes (Fernández, 2000).

Seed Sprouts

Seedlings with dimensions from 1 to 10 cm long are designated as sprouts regardless of their seed of origin. Their metabolism is stimulated by their contact with water, air and warmth. Germination is a set of phenomena or changes produced within the seed that favor the embryo's passage from dormant to active life. Seeds submitted to germination modify their chemical composition and increase their mineral and vitamin contents. Sprouts are better if consumed raw, as cooking destroys most of their nutritional content. The whole sprout can be eaten, including roots and leaves. Sprouts can be consumed alone or they can be added to salads, sandwiches or soups. Beansprouts can be made from different seeds such as wheat, soya, bean, lentil, barley, mustard, and alfalfa, among others. However, those from soya and alfalfa are most commonly consumed worldwide. Among their benefits is their low cost, they can be indefinitely stored, they are easy to grow, and once they sprout their nutritional value increases.

The germination process is simple, cheap, and easy to carry out from a technological point of view. Sprouts are often grown at home without sophisticated techniques or devices, using only some kitchen utensils (Klaus, 1980). For industrial scale production, there are regulations and techniques referring to space disposition, installation, hygiene, production, transport and commercialization (Whyte, 1973). In Mexico and the developing countries these regulations are generally absent, thus they are produced at inadequate sites and in installations with poor hygiene.

There are different methods for seed germination (Whyte, 1973; Klaus, 1980). In all of them they are hydrated until they reach four times their original size or until water saturation. Saturation time varies depending on the type and size of the seed. Once hydrated, excess water is drained and the seeds are placed in a uniform layer within a container in which they germinate at temperatures ranging from 22 to 30° C. and with constant irrigation. Seed sprouts reach a commercially convenient size between 4 and 10 days after hydration. This time depends on the seed type and the germination process employed (Klaus, 1980).

In different countries, once the sprouts have reached the desired size they are usually placed in small polyethylene trays and are covered with plastic film. They are kept refrigerated in this form with a shelf life of 8 days, maximum. In some cases they are packed under modified atmospheres. Chaparro et al. designed a strategy based on the application of the ARPCC system, thus establishing the *codex alimentarius*. As first measure, some reference terms were defined, the minimal work conditions were established, and these must be considered for seed sprouting. This study concluded that the germination process carries physical, chemical and biological risks, the latter being influential for the process and hence for the innocuousness of germinated seeds.

In Mexico it is common to observe sprouts exposed to the public, often without refrigeration, in public and in supermarkets. Some authors point out that this practice favors sprout contamination with pathogenic microorganisms and promotes the activity of these (Mountey and Wilbour, 1971). Particularly, seedlings are obtained after soya sprout germination. They contain higher amounts of water, vitamins, minerals and enzymes, thus their composition is similar to that of vegetables. A benefit from soya seedlings is their richness in vitamins, especially vitamin C, an important antioxidant. Other vitamins contained in high amounts in this sprout are those of the B, A, E and K groups.

The organism assimilates the proteins from soya sprouts well and their consumption is advised for people with digestion problems. Additionally, as with all sprouts, they contribute to intestinal flora regeneration, Because they are rich in chlorophyll, their consumption is also recommended in anemia cases.

Soya seed sprouts are becoming increasingly known and used. They are refreshing, tender, tasty and easy to prepare. They are widely used in cooking: they are ideal in salads and soups, they are a common ingredient in tomato sauces, and they can be used as an additional ingredient in vegetable sandwiches. They also serve as a decorative element or as a side-dish with rice.

Raw sprout consumption has become a risk factor as it has been found that they contain pathogenic microorganisms such as *Salmonella* spp, *Listeria monocytogenes, Staphylococcus aureus, Aeromonas hydrophila* (NACMCF, 1999), *Bacillus cereus* (Portnoy et al., 1973), *Klebsiella pneumoniae, Escherichia coli* O157:H7, *Shigella* and *Yersinia enterocolitica* (Park et al., 2001). These bacteria might be present in the seed or they contaminate the product during seed germination like that of bean, watercress, mustard and soybean. Some studies show that sprouts support the growth of the pathogenic bacteria mentioned above (Harmon et al., 1987; Beuchat, 1996; Hara Kudo et al., 1997).

It has been demonstrated that pathogenic organisms can exceed $10^7$ CFU/g without negatively affecting the appearance of the sprout. In Thailand, several *Salmonella* sp serotypes (Lexington, Orion, Senftenberg, Tennessee, Poona and Weltevreden) have been isolated from soya sprouts (Fordman et al., 1975).

Similarly, in Mexico some contaminated sprouts have been found to contain a wide variety of pathogenic bacteria, the most prominent being *Salmonella* (*typhi* and *typhimurium*), *Shigella* (disenteriae and flexinnery), *Vibrio cholerae* O1 and *Escherichia coli* strains such as enteropathogen *E. coli* (EPEC), enterotoxigenic *E. coli* (ETEC) and enteroinvasive *E. coli* (EIEC) (Fernández, 1997).

Although the mere presence of a pathogenic microorganism in food is a strong reason to avoid consuming it and also to take preventive measures against an outbreak, any increase in pathogen levels in food promotes the risk of disease. For a pathogenic microorganism to trigger clinical symptoms it must enter into the host at sufficient levels. This is termed the minimal infective dose. Pathogen levels below this value have low probability of triggering disease by food consumption. Conversely, levels close to the minimal infective dose or values well above it increase this probability. Consequently, a food is more or less hazardous depending on the pathogen levels it contains.

Sprouts are found to be a substrate that withstands the growth of pathogenic bacteria. For instance, *Salmonella* stanley and *S enteritidis* actively grow in alfalfa sprouts within the first hours of seedling development (Andrew et at, 1982; Geiges et at, 1990).

*Bacillus cereus* also increases its numbers at approximately 4 log within the first germination hours (Harmon et at, 1987), similarly to *K. pneumoniae* (Park and Sanders, 1990; Patterson and Woodburn, 1890). In contrast, Aytac et at (1994) observed that *A. hydrophile* and *L monocytogenes* do not grow on alfalfa sprouts packed under modified atmospheres and kept in refrigeration for 7 days. There was a slight decrease in both pathogen levels, being more effective against *L. monocytogenes*. Geisges et at (1990) reported that *L. monocytogenes* did not grow in soya sprouts in storage temperatures of 4 and 22° C.

It is important to point out that in studies reporting pathogen multiplication in sprouts, it is the seed used for germination that were contaminated with pathogens. Conversely, when there is no pathogen growth, it is the product that was contaminated. Hence, if sprouts are contaminated with *L monocytogenes* or *C. botulinum* from the seed stage, these pathogens are probably able to increase their numbers similarly to *Salmonella* or B. cereus. This hypothesis is supported by observations made by Geisges et at (1990), as they report no growth of *S. enteritidis* during the storage of soya sprouts. This is not the case for seed germination, in which the microorganism actively grew. Based on this behaviour it is concluded that the microorganism fate in food depends on several factors, such as pH, redox potential, antimicrobial substances, local flora, etc. Similarly, the levels of these factors vary through time, creating favorable or unfavorable conditions for growth of a defined microbial group. In sprouts, if a pathogenic microorganism reaches food when it possesses high levels of native flora, its growth might be inhibited through several mechanisms and even its viability could be affected (Flippin and Mickelson 1960; Gilliland and Speck, 1972; Gilliland and Speck, 1977). Consequently, the activity of pathogens becomes limited. On the contrary, when native flora levels are low (as observed in seeds or during the first hours of germination), pathogens have more opportunities to grow. Additionally, if temperature and humidity conditions are favorable (as those observed during germination and sprout growth) the conditions for microbial growth are met. Therefore, it is possible to state that microbial activity is the highest for both local flora and pathogenic microorganisms during the first hours/days of the germination process and during seedling growth.

In Mexico, sprouts are commonly consumed raw or slightly cooked in soups, salads or mixed with vegetables, thereby increasing the potential of contracting a disease associated with the consumption of these seeds (CDC, 1993). During the 1995-1996 period, 16,481 cases of typhoid fever were reported in Mexico (Sistema Nacional de vigilancia epidemiológica, 1997). These were possibly associated with the consumption of raw vegetables that were exposed to fecal contamination. It is worth mentioning that sprouts might become contaminated with the use of untreated residual water, thus contributing to the propagation of these diseases (Bryan, 1997).

In 1999, 157 *Salmonella* app. outbreaks were detected in the United States which were linked to alfalfa sprout consumption, in spite of the fact that they were treated with a disinfectant based on calcium hypochlorite before their germination (Proctor et al., 2001). In 2001, another *Salmonella* spp. outbreak was linked to the consumption of the same sprouts, with there being 22 detected cases (Outbreak Alert Database; 2005). Later, in 2004, a *Salmonella* bovismorbificans outbreak was observed from alfalfa sprouts in which 23 cases were reported. In that same year, an *E. coli* O157:H7 outbreak linked to the consumption of alfalfa sprouts was registered in a food establishment and 2 cases were registered (Outbreak Alert Database; 2005).

It is worth noting that this information comes from research conducted in countries with strict sanitary control regarding sprout production and commercialization. Thus it can be inferred that, given the inadequate production and commercialization practices in our country, the presence of pathogenic bacteria is higher in our products. Consequently, sprouts are participating in outbreaks and disease cases with increased frequency.

Sprouts are highly susceptible to microbial contamination that can be acquired through different mechanisms and at different stages from its generation to its consumption. Seeds have a variable microbial flora (Park and Sanders, 1990; Patterson and Woodburn, 1980; Piernas and Guiraud, 1997), in part depending on the type of seed, its handling and the treatments to which it is submitted. Its contamination with pathogenic bacteria might originate from the field or from its handling. Contamination may come from the water used to irrigate seedlings, if it is contaminated with pathogenic microorganisms. During food harvest, transport and commercialization, the most important contamination source is apparently human, as in these stages food is frequently in contact with humans. Additional factors that might contribute to a lesser degree are utensils, surfaces and the equipment used for food processing and handling.

Seedlings are some of the vegetables that have been involved in disease outbreaks and mega-outbreaks caused by diverse pathogens during recent years. A wide variety of chemical and physical disinfectants have been evaluated alone or in different combinations. Different disinfection processes have also been tested in seedlings. It has been concluded that an accessible and economical practice is impossible to achieve in order to completely eliminate pathogenic microorganisms in sprouts. There is a problem posed by this type of food: if the seed is contaminated with pathogenic bacteria during its germination, they multiply and colonize the plant forming a biofilm, or impermeable film, that protects them against chemical and physical disinfectants. All this occurs within the first 24 hours of seed germination and seedling development, thus it is practically impossible to eliminate bacteria within the first hours of growth. Consequently, the critical step in sprouts production is limited in order to obtain a seed free from pathogenic bacteria. Nevertheless, up until now an effective disinfectant or disinfection procedure that eliminates pathogenic bacteria from the seed has not been reported. In this regard, several disinfectants and treatments have been examined in extreme cases. For instance, submitting alfalfa seeds to 20,000 mg/L hypochlorite. However, this does not ensure the complete elimination of pathogens as *Salmonella* sp, whereas a high hypochlorite concentration causes the death of alfalfa seeds.

In order to find an efficient way to ensure microbial safety in seedlings, a wide variety of methods have been investigated (Fett, 2006), including chemical, physical and natural antimicrobial treatments, and a combination of these (Fett and Cooke, 2003).

Among the most common solutions studied as disinfectant agents are sodium and calcium hypochlorite, hydrogen peroxide, ethanol, carbon dioxide, potassium sorbate, calcium propionate, benzoic acid, salicylic acid, and riboflavin, among others (NACMCF, 1999).

Regarding chemical treatments, the current recommendation issued by the U.S. and the Food and Drug Administration to producers of seed sprouts is to use 20,000 mg/L chlorine, $Ca(OCl)_2$ for a maximum period of 15 minutes in order to reduce the risk of pathogenic agents (Rajkowski et al., 2003). This is the only treatment approved by the U.S. Environmental Protection Agency to be used on seed sprouts that reduces but does not eliminate the number of pathogens. Therefore, the potentially surviving microorganisms are still a hazard to consumers. This has been demonstrated by the detection and growth of *E. coli* O157:H7 in sprouts produced from seeds treated with 20,000 mg/L of free chlorine (Lang et al., 2000).

Generally speaking, disinfection is more effective in seeds in comparison to seedlings. This might be due to the combination of lower levels of microorganisms and organic matter within the seed when compared to sprouts, whereas bacteria internalization within sprout tissue renders them physically inaccessible to sanitizing agents (NACMCF, 1999).

Nowadays, a disinfection process that is more efficient and minimally alters organoleptic properties of the food is radiation. Although it has important limitations because food treated in this manner may not be accepted by the consumer due to the concern of residual radiation. The cost of the equipment and the installations to perform it is also a drawback. Additionally, it has been demonstrated that very low doses such as 1kGy are enough to inhibit seed germination (Konowalchuk and Speirs, 1974).

Therefore this treatment is applicable to the product, but not the seed. One alternative is the use of chemical germicides, Currently, in several parts of the world an effort is being made to develop and evaluate effective and efficient disinfectants in order to eliminate or minimize the risk posed by the presence of pathogenic microorganisms in food such as raw vegetables and seeds used for sprout production. Recent reports express the interest in evaluating disinfection methods based on physical and chemical agents that allow a seed to be free from pathogenic microorganisms (Beuchat, L. R. 1997; Jaquette et al., 1996; Okuda et al., 1994; Piernas and Guiraud, 1997).

Generally, fruits and vegetables are not consumed as soon as they are harvested. In industry (and even at home) they receive several treatments aiming to favor their preservation and/or innocuousness. By applying disinfectants to fruits and vegetables their microbial image improves. Nevertheless, it is difficult to safely achieve microorganism inactivation or removal even in extreme treatment conditions that do not harm the food in a sensory aspect (Fernández, 2000).

The disinfection process refers to the physical destruction of microorganisms with activities that compromise food innocuousness or its sensory properties. This effect can be achieved through physical or chemical means and their effectiveness depends on the microorganism (type and number), the substrate upon which they grow (the presence of organic matter), the material's structure (it should allow the germicide to reach microorganisms) and germicide (concentration, temperature, contact duration) (Fernández, 2000).

During the disinfection process, the germicide substance participates in chemical reactions, thus a higher number of microorganisms requires higher levels of these agents in order to achieve a complete inactivation of the microbial population. Susceptibility towards a specific germicide is variable among microorganisms: some of them are inactivated from their first contact with it, whereas, at the other extreme, some survivors might exist. Finally, it must be taken into account that, among microorganisms the selection of a strain with increasing resistance towards the effect of a specific germicide is possible. Consequently, increasing disinfectant concentrations might be required with time in order to reach the same level of inactivation (Fernández, 2000).

Different studies show that disinfection treatments are often weak or limited. For instance, the treatment of whole tomatoes with 100 mg/L of active chlorine for 2 min is sufficient to inactivate germs such as *Salmonella* sp that were previously inoculated on the tomatoes' surface (Wei et al., 1995), Washing and disinfecting a commercial product based on grapefruit seeds with 200 mg/L of active chlorine (hypochlorite), iodine (iodophor), $ClO_2$ or 100 mg/L, reduced the content in alfalfa sprouts to just 1-2 $\log_{10}$. The decrease of the previously inoculated *S. typhi* or *V. cholerae* O1 was not superior to 1.5 $\log_{10}$ CFU/g (Castro-Rosas and Escartín, 1999).

The food industry has a wide variety of germicide agents. Their virtues and limitations force us to carefully select those that better adjust to each particular need (Fernández, 2000). Germ inactivation in food processing plants is a basic requisite in order to control germs and to keep them from accessing the finished product (Álvarez, 1998). Frequently, a germicide is considered effective when it shows its capacity to inactivate at least 3 $\text{Log}_{10}$ of a microorganism suspension in 30 s (Fernández, 2000).

Chlorine is a cheap disinfectant and it is available as hypochlorite or, alternatively, in its slow release forms (e.g., chloramines) (Lelieveld, 2003). Hypochlorites have a wide spectrum of antibacterial activity, although they are less effective against spores in comparison to bacteria that do not form spores, and they also have a low effect on mycobacteria (Russell y et al., 2004).

Chlorine solutions, such as sodium hypochlorite or chlorine dioxide are widely used by the food industry as disinfectants. Both of them are strong oxidants that act on membranes or other cellular components (Harmon et al., 1987). However, a disadvantage of the former is that it reacts easily with organic matter, thus being rapidly inactivated. There is minimal interference with the latter (Castro-Rosas, 1998), The main disadvantage of sodium hypochlorite is that humidity, heat, light and especially the presence of organic matter increase the loss of free chlorine. The germicide activity has been generally attributed to hypochlorous acid (HOCl), which is generated in aqueous hypochlorite solutions and other chlorine-containing compounds.

Disinfectants can be incorporated into washing water and thus they contribute to microbial load reduction. Hypochlorite effectiveness is not only affected by exposure time and free chlorine concentration, but also by other factors such as temperature, pH, and strain type, as well as the presence and type of organic matter (Álvarez, 1998). It has been observed that by submerging sprouts into 100 and 200 ppm hypochlorite solutions, the presence of Salmonella sp is reduced. However, despite this significant reduction, it was only 1 $Log_{10}$ (Castro-Rosas and Escartín, 1999). Some authors point out that the efficiency of hypochlorite for reducing the presence of pathogenic microorganisms is limited in vegetables (Adams et al., 1989).

Chemical compounds derived from chlorine, iodine and silver have typically been used as vegetables disinfectants, However, some recent studies show that disinfection treatments using these compounds are inefficient regarding the elimination or decrease of pathogenic microorganism levels.

The use of these chemical additives to delay food deterioration or to preserve their innocuousness is a procedure universally employed by food producers. Nevertheless, some of these antimicrobials might be toxic to consumers. This is the case of the nitrites used on meat products (ham, sausages, processed meat, etc.) as they can form nitrosamines that potentially cause cancer. Another example is hypochlorite solutions (widely used in the food and vegetable industry as well as in the home), However, recent reports show that hypochlorite as a solution might generate carcinogenic precursors. In addition, several of the chemical disinfectants, such as iodine-based solutions or colloidal silver, display limited or variable antimicrobial effects in products such as raw vegetables. A similar situation occurs with food preservatives. Because of this, disinfectants and preservatives obtained from plants have recently appeared as a viable alternative. These might have equal or greater antimicrobial potential, along with minimal risk to consumers.

Organic acids have traditionally been employed as food preservatives. Their antimicrobial effect is caused by their non-dissociated forms that cause a pH decrease.

Acetic acid is an innocuous substance and there are no official limits for its daily intake in humans. When acetic acid is included in food, two effects are displayed: one as an acidifier and another as a preservative. A 1-2% concentration inhibits almost all flora within reasonable elevated limits of initial load. At 0.1% it acts on most pathogens, and sporulated at 0.5% it has effects on toxigenic fungus. Acetic acid efficiency has been evaluated against specific pathogens using food as the test medium (Doores, 1993). The published reports are difficult to compare, as acetic acid concentrations are expressed as percentage, molarity, or final pH of the acidified test medium. Its microbial activity depends on exposure time, dissociation level and pH (Levine and Fellers, 1940).

General results show that acetic acid efficiency increases the higher its concentration, it decreases pH, the temperature increases and the microbial load decreases. Because fungi (yeast and molds) grow at low pH values, they display higher resistance towards acetic acid in comparison to bacteria (Luna, 1983). Among all bacteria, Gram-positive tend to be more resistant when compared to the Gram-negative group (Ray and Sandine, 1992). Bacterial spores and viruses are more resistant in comparison to vegetative cells.

In meat, the antimicrobial potential of acetic acid is evident when applied directly. In products such as mayonnaise, tomato sauces and several seasoned foods based on meat, fish and vegetables, acetic acid is included mainly as a flavouring agent, although it also has a preservative effect. For instance, a Salmonella sp concentration of 6.7 $log_{10}$ CFU in a salad (pH 3.5-3.7) containing egg, vegetables, oil, cheese and Italian dressing, was reduced to non-detectable levels of pathogens after 10 minutes due to the effect of the vinegar (acetic acid) contained in the salad.

Several countries have abandoned the use of hypochlorite or iodine solutions for food disinfection. Plant-derived components with sufficient antimicrobial activity and low toxicity toward humans, such as cinnamaldehyde, might be good alternatives. It has been demonstrated that treatment of the surface of tomatoes with trans-cinnamaldehyde significantly reduces the number of deteriorating bacteria and fungi (Rahman and Shafiur, 1999).

Garlic extract is applied to fresh fruit to protect it against post-harvest diseases and a complete control has been obtained over brown putrefaction of peaches caused by Monilinia fructicola (Roller, 2003). Yucel and Karapinar (2005) evaluated S. typhimurium decrease in onions through the application of lemon juice, vinegar and mixtures of both, and they observed a reduction of 0.87-2.93, 0.66-2.92 and 0.86-3.24 Log CFU/g, respectively.

In yet another study, Muñoz (2003) evaluated the effect of two carvacrol concentrations and the commercial disinfectant Boradantix© (EVESA, Extractos Vegetales S.A.) on the survival of L. monocytogenes, P. fluorescens, E. coli, Erwinia caratovora and S. typhimurium in lettuce juice and carrots. All microorganisms under study were inhibited at both carvacrol concentrations. The studied bacteria displayed higher sensitivity towards carvacrol when compared to Boradantix©.

Lin et al. (2000) evaluated the effect of allyl- and methyl-isocyanate (AITC/MITC) (key components of mustard greens) on L. monocytogenes, E. coli O157:H7 and S. montevideo inoculated on the surface of lettuce and tomatoes. An 8 Log decrease was achieved on the lettuce by treating them with the vapor generated by 400 µl AITC after 4 and 2 days, respectively. An 8 Log decrease of S. Montevideo was also observed on tomato cuticle with 500 µl AITC.

Andrade (2004) evaluated the effectiveness of several seed-based disinfectants on the damage caused by radical rotting (Gaeurnannomyces graminis, tritici var.) of wheat. The results allowed him to assess that active ingredients of the seed (triticonazole, triadimenol and silthiofam) attained the delay and/or decrease caused by this pathogen.

It is common to find substances in food that have an inhibitory effect against some type of germ. At the concentrations at which these substances are generally found in food they display a selective effect, i.e. a particular microorganism is inhibited at different magnitudes when compared to others (Fernández, 2000). Antimicrobial agents can be grouped according to their respective origins, as indicated in Table 1.

TABLE 1

| | Antimicrobial substances in foods | |
|---|---|---|
| Natural | Constitutive | Tarpenes, phenols |
| | Generated during manufacturing | Hydrogen peroxide, lactic acid, nisin. |
| Added | Legally | Directly: ascorbic acid. |
| | | Indirectly: gas mixtures. |
| | Fraudulent | Carbon dioxide |
| Residual | From food generation: penicillin in the milk excreted by udder. | |
| | During equipment cleaning with germicides | |

Herbs and spices are widely used in the food industry as flavoring agents and fragrances. However they also display useful antimicrobial and antioxidant properties. Several plant derivatives contain antimicrobial compounds that possess a broad-spectrum activity against bacteria, fungi and mycobacteria. Although 1300 plants have been reported as potential sources of antimicrobial agents, up to this date such alternative compounds have not been sufficiently used in food. In the last 20 years, hundreds of scientific articles have demonstrated the antimicrobial activity of natural compounds against pathogenic and deteriorating microorganisms. However, very few of them have been used in real applications in food (Roller, 2003). Antimicrobial activity of compounds derived from plants against different microorganisms has been individually assayed in vitro and they are well documented in references. (Tables 2 and 3) (Roller, 2003; Jongen, 2005).

TABLE 2

Plants with antibacterial activity

Annatto, basil, almond (bitter, sweet), anethole, *angelica*, anise, asafetida (*Ferula* sp.), birch, absinth, garlic, star anise, piper, musk, celery, tea tree, artemlsia (*Artemisia vulgaris*), bergamot.
Cajeput, calamus, *cananga*, cardamom, husk of the *hassaku* fruit, onion, cedar, sagebrush (*Artemisia tridentata*), chilli, cinnamon, citronella, clove, coriander, cortuk (*Echinophora sibthorpiana* Guss.), cumin, tumeric, *cymbopogon*.
Dill, *helenium*, tarragon, *eucalyptus*,
Flowers from the bitter orange tree, lima flower.
Sweet gale, *gardenia*, *geranium*, *gaultheria*, *lentiscus* tree gum.
Mint, fennel, incense.
Jasmine, ginger.
Laurel, lavender, lemon, lime, lovage.
Mandarin orange, german chamomile, marjoram, melissa, *Mentha suaveolens*, mustard.
Orange, nutmeg.
Ocimum, onagra, oregano.

Reference: Roller, 2003

TABLE 3

Some natural antimicrobial compounds in plants

Apigenin-7-O-glucoside, aureptan, benzoic acid, dihydrocaffeic acid, caffeic acid, 3-O-caffeoylqulnic acid, 4-O-caffeoylquinic acid, 5-O-caffeoylquinic acid, cinnamic acid, chlorogenic acid, ferullic acid, gallic acid, 4-hydroxybenzoic acid, 4-hydroxycinnamic acid, 3-methoxybenzoic acid, protocatechuic acid, 3,4,5-trimethoxybenzoic acid, 3,4,5-trihydroxyphenylacetic acid, vanillic acid.
Berbaman, berberine, borneol.
Caffeine, carnphene, camphor, carnosol, carnosic acid, carvacrol, caryophyillene, catechin, cineol, cinnamaldehyde, citral, chicorin, columbamine, coumarin, p-coumaric acid, o-coumaric, p-cymene, cinarin.
Dimethyl oleuropein.
Esculin, eugenol.
Geraniol, gingerol.
Humulone, hydroxytyrosol.
Isovanillic, isoborneol.
Linalool, lupulone, luteolin 5-glucoside, ligustroside, S-limonene.
Myricetin, menthol, menthofuran.
Oleuropein
Paradols, o-pyrocatecuin, alpha-pinene, beta-pinene, pulegone
Quercetin
Rutin, resorcylic
Salicylaldehyde, sesamol, shogaols, syringic acid, sinapic.
Tannins, thymol, tyrosol.
Verbascoside, vanillin.

Reference: Roller, 2003

Plants produce a variety of chemical compounds with antimicrobial activity. Some of them are natural components of the plant and others are produced in response to physical lesions as they allow an enzyme-substrate interaction, and some others (phytoalexins) are produced in response to microbial invasion. These compounds are lethal to microbial cells, or they can simply inhibit the production of a specific metabolite (e.g., mycotoxin). The protective role they fulfill in the plant and their potential as an antimicrobial in food has been a subject of interest to many researchers (Jongen, 2005).

In vitro studies show that almost every essential oil from herbs and spices inhibit microbial growth as well as toxin production. Antimicrobial effect is dependent on the concentration and it can be a strong bactericide at high concentrations. Several Gram-positive, Gram-negative, yeast and fungi are affected by a wide variety of essential oils from plants. Well known examples include essential oils from English pepper, almond, laurel, black pepper, cinnamon, caraway, clove, coriander, cumin, garlic, grapefruit, lemon, nutmeg, mandarin orange, onion, orange, oregano, rosemary, sage and thyme (Roller, 2003).

Thyme essential oils (*Thymus* genus) have been tested on different microorganisms. 200-250 ppm concentrations of *T. capitatus* (the most common thyme) completely inhibited the growth of *Penicillium italicum, Penicillium digitatum, Botrytis cinema, Alternaria citri, Alternaria alternate, Fusarium oxysporum* and *Rhizopus stolonifer.*

Using extracts from *Thymus vulgaris, B. cinerea* and *R. stolonifer* were inhibited by 50% (Roller, 2003). Carvacrol has been identified as the substance responsible for antimicrobial activity in *T. capitatus* essential oils. Thymol, carvacrol and linalool are active agents in *T. vulgaris*. However, other components at lower levels might also contribute in a synergistic manner to the antimicrobial activity of a given essential oil. A marked synergism between nisin and carvacrol has been registered as bactericide and bacteriostatic against *B. cereus* and *L. monocytogenes* (Roller, 2003). Essential oils (EO) in oregano (*Origanum* spp.) contain thymol and carvacrol and they have both been known as very active agents against several mycotoxigenic fungi and to some citrus disease-inducing agents.

Among the complex components contained in EO from citrus fruits, the citral terpene (3,7-dimethiyl-2,6-octadienal) is known to have strong antifungal properties. Recent studies in vitro demonstrated that citral inhibits *P. expansum, P. italicum* and *P. digitatum*, all of them identified as responsible for severe putrefaction during the storage of apples and citrus fruits, However, due to its toxicity, citral might be difficult to use in fresh fruits and vegetables (Roller, 2003).

In several studies, plant extracts have been used to extend the shelf life of food (Jongen, 2005). Extracts from some garlic species inhibit in vitro growth of the of *Aspergillus parasiticus, A. Niger, A. flavus* and *A. fumigatus* among many others, all of them being fungi that contribute to the deterioration of grains, vegetables and processed foods. The synergism between nisin and aqueous garlic extract for inhibiting *L. monocytogenes* has been described previously. In general, garlic extract activity decreases during storage and upon heating. Raw aqueous extracts are more active in comparison to ethyl acetate, ether, chloroform and ethanol extracts (Roller, 2003).

Red beet juice displays a slight antimicrobial activity against *E. coli* pathogenic groups: enteroinvasive, enteropathogen and enterotoxigenic, and also to *S. typhimurium* (Ramírez, 2006). In a study performed with 19 aqueous extracts from the leaves of local plants in our country, 8 of them displayed activity against *Rhizopus stolonifer* sporulation. Three of these extracts (*Annona cherimola M., Bromelia hermisphaerica* L. and *Carica papaya* L.) were also active against *R. stolonifer* in plums (*Spondias purpurea* L.). Extracts from Aloe vera pulp have been tested in vitro against the pathogens commonly observed during harvest; *P. digitatum, P. expansum, B. cinerea*, and *Alternaria alternata*, the first and the latter being the most sensitive. Aqueous extracts from the leaves of *Azadirachta indica*, Adv. Juss., *Datura fistulosa* L., *Muraya exotica* L., *Lantana camara* L., *Ocimum sanctum* L. and *Catharantes roseus* L. almost completely inhibited the diseases caused by *Fusarium scirpi* and *Helminthosporium spiciferum* in *Luffa cylindrica* L when they were applied after pathogen infection (Roller, 2003). Extracts obtained from *Euphorbia macroclada* Boiss stem, flower and leaves were tested in vitro against plant pathogenic fungi, including pre-harvest pathogens. The highest activity detected was against *R. stolonifer*, and the lowest against *A. solani* (Jongen, 2005).

There have been relatively few studies regarding the antimicrobial action of essential oils using food system models and real food (Table 4). However, the effectiveness of essential oils in vitro is commonly much better when compared to in vivo or in situ situations, i.e. in food. For instance, mint (*Mentha piperita*) essential oil has been proven to inhibit *Salmonella enteritidis* and *Listeria monocytogenes* growth in culture media for 2 days at 30° C. However, the effect of this essential oil on the Greek appetizers tzatziki (pH 4.5), taramasalata (pH 5.0) and paté (pH 6.8) at 4° C. and 10° C., was variable (Roller, 2003). *Salmonella enteritidis* was eliminated in appetizers at all conditions tested but not when it was inoculated in pâté kept at 10° C. In this same study *L. monocytogenes* displayed a similar behavior as the microbial count decreased in appetizers, but it had the opposite effect on pâté (Roller, 2003), *E. coli, Salmonella* spp., *L. monocytogenes* and *Staphylococcus aureus* growth was inhibited by oregano essential oil in culture broth. However, when these oils were tested on foods such as eggplant, taramasalata and mayonnaise, some reactions were observed, such as pH increase, temperature increase and, in the case of emulsions, a phase separation of the employed oil (Roller, 2003). In another study, *L. monocytogenes* and *S. typhimurium* were inhibited in meat treated with clove essential oil and oregano, respectively. A marked decrease of *Aeromonas hydrophila* has also been reported in cooked pork meat treated with clove or coriander oils, either vacuum- or air-packed, and stored at 2° C. and 10° C. (Roller, 2003).

The observed differences between studies, regarding antimicrobial effect when plant-derived oils are directly applied to microorganisms (in aqueous suspension) and those employing food or organic matter, might be due to interference from food components or from the organic matter itself (proteins, fats, sugars, salts). Therefore it is possible that a small fraction of the essential oil added to food has antibacterial activity. Conversely, space distribution of the different phases (solid/liquid) in food, the lack of homogenous pH or $a_w$, among other factors, may have a role in effectiveness.

TABLE 4

| Examples of essential oil application in food | | |
|---|---|---|
| Food | Microorganism | Essential oil |
| Milk (fresh, without cream) | S. aureus<br>Salmonella enteritidis<br>P. frangi | Lentiscus gum |
| Dairy products: soft cheese, mozzarella. | L. monocytogenes<br>Salmonella enteritidis | Clove, cinnamon, thyme |
| Fresh meat: whole or ground | Salmonella typhimurium and enteritidis<br>S. aureus<br>P. frangi<br>L. monocytogenes<br>Lactic acid bacteria<br>B. thermosphacta<br>Enterobacteriaceae<br>Yeast<br>Local flora | Oregano, clove, basil, sage |
| Meat products: pâté | L. monocytogenes<br>Salmonella enteritidis<br>Local flora | Mint |
| Sausage | B. thermosphacta<br>E. coli | Mustard oil |
| Fish: golden snapper | Salmonella enteritidis<br>S. aureus<br>Local flora | Oregano |
| Cod fillet, salmon | Photobacterium phosphoreum | Basil, laurel, cinnamon, clove, cymbopogon, marjoram, oregano, sage, thyme |
| Salads and preparations: tuna, eggplant, taramasalata, mayonnaise, tzatziki. | S. aureus<br>Salmonella enteritidis<br>P. frangi<br>L. monocytogenes<br>S. putrefaciens<br>B. thermosphacta<br>E. coli<br>Local flora | Mint, oregano, basil, sage |
| Sauces: meat sauce | Salmonella enteritidis and typhimurium<br>S. aureus<br>P. frangi | Basil, sage |

Due to this, in several parts of the world a number of studies are being carried out searching for alternative antimicrobials (Jongen, 2005). Among the new disinfectant alternatives, natural compounds with a wide antimicrobial capacity have been selected.

It is noteworthy that extracts obtained from some plants have displayed antimicrobial effects against strains carrying antibiotic muitiresistance, thus opening a whole new field for antimicrobial development for human and animal consumption.

Recently, it has been reported that hibiscus flower calyxes (*Hibiscus sabdariffa* L) possess substances with high antimicrobial potency (Aziz et al., 1998; Che-Yi and Mei-Chin, 2009; Fernández et al., 1996; García et al., 2006; Kang et al., 2007; Keh-sen et al., 2005; Metwali, 2003). In our work group the antimicrobial effect of nearly 50 different plants commonly used in herbal medicine has been evaluated. Some of them have displayed a high antimicrobial potency against different pathogenic microorganisms, such as *Salmonella* sp, and *Escherichia coli* O157:H7, among others. This effect includes food deteriorating microorganisms (e.g. *Pseudomonas aeruginosas*). In some cases the antimicrobial effect is more significant in comparison to commercial disinfectants based on hypochlorite, iodine, colloidal silver, or even antibiotics such as penicillin. Several solutions and powders have been obtained from plant extracts displaying the highest antimicrobial effect and their antimicrobial potential has been evaluated. Solutions have been tested on fruits and vegetables contaminated with pathogenic bacteria, whereas powders have been incorporated into several foods, e.g. cheese and cold cuts. Results from these studies show a significant decrease in concentration of all studied bacteria in all of the foods evaluated that have been in contact with solutions or powders derived from plants.

Hibiscus is one of several plants in which the presence of antimicrobial compounds has been reported in their dehydrated calyxes (Fernández et al., 1996; Aziz et al., 1998; Keh-sen et al., 2005; Metwali, 2003; García et al., 2006; Kang et al., 2007; Olaleye 2007; Che-Yi and Mei-Chin, 2009; Wong et al., 2010). Antimicrobial properties contained in plants are affected by several factors such as genotype, environment, harvest season, storage, substance extraction procedures, geographical location, and altitude, among others (Brandi et al., 2006). Consequently, the comparison of results becomes more difficult.

Several phytochemicals with antimicrobial properties have been detected in hibiscus flowers, such as polyphenols (Tajkarimi et al., 2010) and, among them, some phenolic acids (Beuchat, 2001), as well as flavonoids (Cushnie and Lamb, 2005), catechins, and epicatechins (Ikigai et al., 1993; Friedman, 2007; Kuete et al., 2008).

Several patent documents describe hibiscus (*Hibiscus sabdariffa*) flower extracts and their use as a material with antimicrobial properties.

For instance, patent application JP2002128602 describes its use in an agrochemical composition employed to protect plants in fields, whereas the US20100323046 application describes the use of the hibiscus flower raw extract to produce a medication for urinary infection treatment caused by *Escherichia coli* and *Candida albicans*.

In patent application KR20080092186 it is described that a hibiscus extract is used to improve the quality of beef, pork and chicken meat, and also to increase their storage stability. The extract is prepared through ethanol extraction and is submitted to a freeze-drying process. Extract concentration in this composition is 500 mg/ml, whereas meat is treated with a preparation at 0.5-3.0% (per weight).

On the other hand, the US20120015062 application describes two compositions containing extracts from the plant *Agapanthus africanus* and other compositions containing this and other extracts from different plants, e.g. plants from the Rose family or from alfalfa. These are used as biologic agents to protect other plants, including their seeds. Despite this application document referring to the article published by Leksomboon et al, (Kasetsart, Journal of Natural Science 35: 392-396, 2001), in which it is mentioned that extracts obtained from several plants (*Hibiscus sabdariffa, Psidium guctjava, Punica granatum, Spondias pinnate* and *Tamarindus indica*) have antimicrobial function, no experimental evidence is shown that involves *Hibiscus sabdariffa* extracts in the same applications as *Agapanthus africanus*.

Based on this, it is necessary to have effective antimicrobial compositions in order to avoid and/or counteract microbial contamination of food, especially that which is consumed raw, sprouts for instance. The aim is to preserve and consume it, without the risk of contracting diseases caused by its contamination with microorganisms.

DETAILED SPECIFICATION OF THE INVENTION

This invention describes compositions containing phytochemicals from plant extracts used as disinfectants and/or preservatives for food of vegetable and animal origin. For instance, they are aimed to be used for fresh food disinfection and preservation, particularly for the disinfection and/or preservation of sprouts derived from edible seeds.

One modality of this invention refers to obtaining a vegetable preparation containing a plant extract useful for eliminating pathogenic agents found on foods (disinfectant effect) and for delaying food deterioration or preserving their innocuousness (preservative effect).

Another modality of this invention refers to obtaining plant-derived extracts used as disinfectants against pathogenic agents found on foods, and to delay food deterioration and/or preserve their innocuousness, i.e. as food preservatives, offering an alternative to traditional disinfectants that might be toxic to humans, animals or the environment.

Another modality of this invention refers to the elaboration of compositions containing plant extracts exhibiting disinfectant and food preservative functions, along with other compounds with disinfectant properties, e,g. acetic acid, hypochlorite, etc.

Another modality of this invention refers to obtaining extracts from the calyxes of the hibiscus plant (*Hibiscus sabdariffa* L.), displaying a disinfectant or preservative effects when applied to food. One aspect of this modality refers to the application of extracts obtained from calyxes of the hibiscus plant (*Hibiscus sabdariffa* L.), possessing a disinfectant or preservative effect when applied to plants and/or seeds.

Another modality if this invention is the development of a method for obtaining extracts from hibiscus calyxes, which are useful as a disinfectant and food preservative.

Another modality of this invention is a method for treating and/or preserving food of animal and/or vegetable origin through the application of compositions containing extracts from hibiscus calyxes, which allow their disinfection and/or preservation.

The use of extracts from hibiscus calyxes as a disinfectant and/or food preservative is another modality described in this invention.

The compounds from hibiscus calyxes might be useful for the elaboration of an efficient disinfectant in order to eliminate pathogenic bacteria contained in seeds, such as alfalfa seeds, and the mung bean, among others. In this invention an extract from hibiscus calyxes is described. It contains phytochemicals that can be used as a disinfectant and/or food preservative due to its efficiency in eliminating pathogenic bacteria in foods such as seeds or their sprouts.

Unlike other known compositions that have been used to this date for the same purposes, the compositions in this invention are able to eliminate microbial contamination in fresh food considered difficult to preserve, such as seed sprouts and seeds themselves, without altering their alimentary properties or their germination ability. Consequently, the application of the compositions described in this invention to fresh food allows its preservation and effective disinfection, rendering it safe for consumption.

The compositions in this invention are comprised of plant extracts with known antimicrobial activity, as is the case of aqueous hibiscus extracts, either alone or in combination with other components with previously tested disinfectant activity, such as organic acids including acetic acid, and chlorine compounds including sodium hypochlorite. When disinfecting fresh food such as sprouts derived from seeds, the compositions in this invention that include a mixture of aqueous plant extract with antimicrobial activity, as well as acetic acid and hypochlorite, are often effective for eliminating all microorganisms residing in food. At the same time, their organoleptic and/or nutritional properties are not affected and the seed's germination ability is not altered.

For the purposes of this invention, the compositions described herein comprise:

a) Extracts derived from plants displaying antimicrobial properties, for instance the extracts derived from hibiscus (*Hibiscus sabdariffa* L) calyxes, a mixture of extracts from stem, leaves and flowers of the plant known as "Mexican merigold" (*Tagetes lucida*), an extract from stem and leaves of eucalyptus (*Eucalyptus* app), an extract from *Flourensia resinosa* S. F. Blake leaves, and a mixture of extracts from stem, leaves and flowers of absinth (*Artemisia absinthium*) ______, and a mixture of these at a ______1-20______% (w/w) concentration, preferably at ______1-10______%.

b) An organic acid with disinfectant activity, for instance acetic acid, lactic acid, citric acid, peracetic acid, octanoic acid, peroxiethanoic acid and 1-hydroxyethyllindiene-1,1-diphosphonic acid, and mixtures of these at a ___0.1-10___ % (w/w) concentration, preferably ___0.1-1___.

c) A chlorine compound with disinfectant activity such as sodium hypochlorite, calcium hypochlorite, chlorine dioxide, and mixtures of these at a 0.001-10___% (w/w) concentration, preferably ___0.001-0.1___%.

For the purposes of this invention, these compositions are added in order to disinfect and/or preserve food through the known methods in the art, such as direct application, spraying, or through devices that alllow their dispersion on the food that is being treated. The amount of the compositions in this invention may be added at 0.1___mL per ___1000___g of food, and preferably at ___1___mL per ___100___g of food. They can be added in larger volumes depending on the food disinfection needs. After application, the compositions may remain for the necessary period of time until the desired disinfectant and/or preservative effect is reached in food. Before consumption, food treated with the compositions described herein is simply washed in order for the compositions to be eliminated.

The compositions described herein may be obtained through the mixing of their components at the desired concentrations to be stored later at room temperature, ready to be applied to food when required.

For the purposes of this invention, the compositions described herein may only contain vegetable extracts with antimicrobial activity, such as the extracts derived from hibiscus calyxes, which are added to fresh food, like seed sprouts, in order to disinfect and/or preserve them. In this invention the disinfectant activity of extracts derived from hibiscus for food disinfection and/or preservation is described, such as in the case of fresh food. Thus they can be either applied directly or as part of compositions. In this sense, the extracts derived from hibiscus may be added to food to be disinfected and/or preserved at ___0.001-1___% (w/w) concentrations, preferably ___0.1-1___%. Disinfectant and/or preservative effectiveness on food by the compositions described herein eliminates all microorganisms that the food might contain, whereas its organoleptic and/or nutritional properties are not affected. In the case of fresh foods such as seed sprouts, the compositions described in this invention appropriately disinfect them without affecting their alimentary properties, and their seed germination properties remain unaffected when germination is desired after sprout elaboration. This allows their appropriate preservation, avoiding eventual microbial contaminations.

The vegetable extract of this invention may be obtained by the following method:

a) Place the dry plant in a vessel under aseptic conditions, add water and heat until boiling. Preferably, 100 g of dry plant are placed in a container (flask) under aseptic conditions. 900 mL of distilled water are added and boiled for 20 minutes.

b) Allow to cool at room temperature, remove the plant debris and recover the aqueous extract. Preferably, the resulting extract is recovered after pressing against the flask wall in order to remove excess liquid.

c) Pass the extract through a sieve and eliminate the water from the extract. Preferably, the extract is passed through a No. 200 sieve and water is removed from the extract using a rotatory evaporator at a 40° C. temperature, 80 rpm rotation and a vacuum pressure of 72 mbar.

d) Recover the dry extract. Preferably in a sterile container.

When the extract is obtained, it is stored at room temperature until use.

Once the extract is obtained, it can be used alone or in combination with other disinfectants in order to obtain the compositions described in this invention. They may be obtained through the known methods in the art, implying the combination of the different constituting elements in order to form solutions and/or suspensions to be subsequently applied to the food with the purpose of disinfecting and/or preserving it using the methods known in the art. This invention is the first document reporting the use and effectiveness of compositions containing vegetable extracts with antimicrobial activity, either alone or in combination with other disinfectants, for disinfecting and/or preserving food, particularly fresh food such as edible seed sprouts. It is later shown that compositions in this invention are able to efficiently disinfect and/or eliminate microorganisms residing in seeds. It is thus possible to prevent microorganism growth in sprouts from seeds, rendering them safe for consumption. Before this invention, it had not been possible to develop effective compositions for disinfecting fresh food, like those which are described herein, which preserve the food's nutritional properties without affecting the seed's ability to germinate. Thus, through the application of this invention, it is possible to obtain sprouts from disinfected seeds, free from microorganism contamination.

Next, some examples are included with the sole purpose of illustrating this invention, without implying any limitation of its reach

EXAMPLE 1

Materials and Methods

Vegetable Material

Dry hibiscus (*Hibiscus sabdariffa* L) calyxes were used from the creole variety obtained in Oaxaca, whereas soybean seeds (*Vigna radiata* L) and alfalfa seeds (*Medicago sativa* L) were provided by a manufacturer of sprouted seeds. Seeds were acquired from Australia.

Bacterial Strains

The following strains were employed: *E. coli* O157:H7 (P1C6, isolated from a disease outbreak), enteroinvasive *E. coli* (4VC81-5, isolated from a clinical case), enterotoxigenic *E. coli* (1620 TL, isolated from a clinical case), enteropathogenic *E. coli* (52 GM 291, isolated from a clinical case), *Salmonella typhimurium* (ATCC 14028), *Salmonella choleraesuis* (ATCC 10708), *Listeria monocytogenes* (ATCC 19115), *Listeria monocytogenes* Scott A, *Staphylococcus epidermis* (ATCC 12228), *Staphylococcus aureus* (ATCC 25923), *Pseudomonas aeruginosa* (ATCC 27853), *Bordetella* (ATCC 12741) *Shigella sonnei* (ATCC 25931) and *Shigella flexneri* (ATCC 12022), *V. cholerae* (87151, Inaba serotype isolated from the environment) and *Pseudomonas aeruginosa* (ATCC 27853). *E. coli* O157:H7 and V. cholerae O1 strains were donated by Dr. Fernández Escartín at Universidad Autónoma de Querétaro. All strains were marked with resistance to the antibiotic rifampicin (R+) in order to eliminate interference from the local flora of the extract (Castro y Escartín, 2000; Rojas, 2005; Moreno, 2006). This antibiotic resistance was conserved throughout the whole study. Strains were kept at 4-7° C. in blood-based agar (ABS, Merck®, Germany), transference being performed every two weeks, and being activated in typticasein soy broth (CST, Bioxon®, Mexico) with incubation at 35° C./24 h.

Obtaining Aqueous Extract from Hibiscus Calyxes

Under aseptic conditions, 100 g of hibiscus calyxes were placed in an Erlenmeyer flask and 900 mL of distilled water was added. The mixture was boiled for 20 minutes. Once this treatment was finished, the mixture was allowed to cool at room temperature. Calyxes were removed from the extract (after pressing them against the flask walls in order to remove excess liquid) and it was passed through a No. 200 sieve (MONTIMAX) in order to eliminate particles. Finally, all water was separated from the extract using a rotatory evaporator (Buchi R-205) using the following conditions: heating bath temperature of 40° C., 80 rpm rotation and vacuum pressure of 72 mbar. The dry extract was recovered in a sterile flask and stored at room temperature until its use.

Antimicrobial Activity Assessment of Hibiscus Aqueous Extracts

1. Strain Inoculum Preparation

Test tubes containing each R(+) strain grown for 24 h in STB (soy trypticasein broth) medium were centrifuged at 3500 rpm for 20 min. Supernatant was discarded afterwards and cell pellet was resuspended by adding sterile ISS (isotonic saline solution) and vortexing for 10 s. This procedure was repeated twice. The concentration of each strain was approximately $1 \times 10^9$ CFU /mL. Finally, each strain was 10-fold diluted with ISS.

2. Diffusion Technique

100 μL from the first dilution of the respective pathogen culture were inoculated in AST plates. Inoculum was completely distributed on agar surface by the surface extension technique. From the dry extract, a 10% solution of hibiscus calyxes was prepared with distilled water. 10 μL aliquots of this extract were placed on each inoculated plate. Four repetitions were carried out. After the extract was absorbed by agar the plates were incubated at 35±1° C. for 24 h. Finally, the diameter of each inhibition zone was measured on the inoculated surface.

Evaluation of Vegetable Extract on *Salmonella* and *E. coli* O157:H7 Decrease in Soya Seeds 1. Strains 7 *Salmonella* serotypes were used in this experiment (3 typhimurium [ATCC 14028, one isolated from tomato, J1, and another from alfalfa seeds, GA1], *Salmonella choleraesuis* [ATCC 10708], typhi, gaminara and montevideo) and 3 *E. coli* O157:H7 (two of them were isolated in our laboratory from raw meat [P1C6 and M5C8] and the other was isolated from an outbreak caused by meat consumption in the United States [E09]). All strains were marked with resistance to the antibiotic rifampicin (R+) in order to eliminate interference from the extract's microbial flora (Castro and Escartin, 2000; Rojas, 2005; Moreno, 2006).

2. Strain Inoculum Preparation

Test tubes containing each R(+) strain grown for 24 h in STB medium were centrifuged at 3500 rpm for 20 min. Supernatant was discarded afterwards and cell pellet was resuspended by adding 3 mL of sterile ISS and vortexing for 10 s. This procedure was repeated twice. The resulting concentration of each strain was approximately $1 \times 10^9$ CFU /mL. 1 mL of each *Salmonella* strain was mixed in an empty test tube in order to have a mixture of all 7 *Salmonella* strains tested. This same procedure was carried out with *E. coli* O157:H7 in order to have a mixture of all three strains. 1 mL of the washed *Salmonella* or *E. coli* O157:H7 was added to 200 mL of sterile water in a beaker. The suspension was homogenized by rotating for 1 min. 100 g of alfalfa or soya seeds were immersed for 10 min in the 200 mL suspensions. After this time, the suspension was poured, the seeds were recovered in a strainer and allowed to drain over a vessel for 20 minutes inside a class II biosafety hood. Seeds were arranged in a monolayer on a plastic tray and allowed to dry for 2 hours at room temperature inside a class II biosafety hood. Afterwards, the tray was covered with a plastic film and stored at room temperature for 15 days. After this period, 10 g of alfalfa or soya seeds were randomly chosen separately and submitted to the treatments mentioned in Table 5.

TABLE 5

Treatments that were applied separately to alfalfa and soybean seeds previously contaminated with *Salmonella* sp or *E. coli* O157:H7 strain mixtures

| Treatment number | Treatment features* |
| --- | --- |
| 1 | Sterile water (control) |
| 2 | 1% dry *hibiscus* extract solution[1] |
| 3 | 0.1% acetic acid solution |
| 4 | 0.5% acetic acid solution |
| 5 | 1% acetic acid solution |
| 6 | 100 mg/L sodium hypochlorite solution |
| 7 | 1,000 mg/L sodium hypochlorite solution |
| 8 | 10,000 mg/L sodium hypochlorite solution |
| 9 | 1% dry *hibiscus* extract and 0.1% acetic acid solution |
| 10 | 1% dry *hibiscus* extract and 0.5% acetic acid solution |
| 11 | 1% dry *hibiscus* extract and 1% acetic acid solution |
| 12 | 1% dry *hibiscus* extract, 0.1% acetic acid, 100 mg/L hypochlorite solution |
| 13 | 1% dry *hibiscus* extract, 0.1% acetic acid, 1000 mg/L hypochlorite solution |
| 14 | 1% dry *hibiscus* extract, 0.1% acetic acid, 10,000 mg/L hypochlorite solution |
| 15 | 1% dry *hibiscus* extract, 0.5% acetic acid, 100 mg/L hypochlorite solution |
| 16 | 1% dry *hibiscus* extract, 0.5% acetic acid, 1000 mg/L hypochlorite solution |
| 17 | 1% dry *hibiscus* extract, 0.5% acetic acid, 10,000 mg/L hypochlorite solution |
| 18 | 1% dry *hibiscus* extract, 1% acetic acid, 100 mg/L hypochlorite solution |
| 19 | 1% dry *hibiscus* extract, 1% acetic acid, 1000 mg/L hypochlorite solution |
| 20 | 1% dry *hibiscus* extract, 1% acetic acid, 10,000 mg/L hypochlorite solution |

*In all cases the seeds were completely immersed in 50 mL for 30 minutes

After treatments, solutions were decanted separately and excess water was removed by filtering through a metal strainer, letting it rest for 2 min over a container. Subsequently, the seeds of each treatment were placed in separate bags containing 90 mL of peptone diluent and the counting of surviving bacteria was performed using the pour plate technique using trypticasein soy agar supplemented with 100 mg/L rifampicin. Finally, culture plates were incubated at 35° C. for 48 h.

Similarly, 10 g portions of soybean and alfalfa seeds also subjected to the same treatments described in table 5, were used to continue the germination process. In this case, after treatment, the solutions under study and their excess were removed as described above. Each 10 g portion of treated seeds was placed in 50 mL of sterile water for 4 hours in order to hydrate the seeds. Then, seeds were removed from the water and placed on a plastic tray surface in a monolayer. The tray was covered with plastic film and stored at room temperature for 48 hours. Seeds were irrigated every 24 h using sterile water. Finally, the percentage of non-germinated seeds in each treatment was assessed at 48 h, and subsequently, the count of *Salmonella* and/or *E. coli* O157:H7 was carried out using the pour plate technique using trypticasein soy agar supplemented with 100 mg/L rifampicin, as previously described.

Germination Procedure.

50 g of seeds (alfalfa or soybean) were placed in an Erlenmeyer flask, 200 mL of sterile water was added and the flask was shaken vigorously for 20 s. After this treatment, the water was discarded. Afterwards, 200 mL of sterile water was added to the flask and the seeds were kept submerged in potable water for 4 h at room temperature (hydration). After this period, the water was removed and the seeds were spread on a plastic tray surface in a monolayer. The tray was covered with plastic film to prevent dust pollution. Trays were stored at room temperature for 5 days. Every 24 h, seeds were hydrated by spraying sterile water.

EXAMPLE 2

Determination of the Extract's Antimicrobial Effect

The aqueous plant extract exhibited a marked antimicrobial effect (Table 6). All tested microorganisms were inhibited from the first moments of contact. The observed inhibitory effect suggests the presence of antimicrobial substances in the extract. This effect causes lethal damage to the cell or at least either a sub-lethal effect or cellular stress (Busta, 1976). Several vegetal components could be responsible for this antimicrobial effect, such as anthocyanins (Mazza, 2000). In addition to the potential antimicrobial components, it is assumed that antimicrobial activity of the vegetal extract may be due to its pH, since it has a value between 2 and 4. To explore this, the antimicrobial effect of the vegetal extract was studied at different pH values (data not shown), finding that the antimicrobial effect of the extract decreases by increasing pH. However, a pronounced effect at pH 5 was observed in comparison with normal pH. Regardless of the effect observed with pH increase, our results show that the major antimicrobial effect of the vegetal extract is related to other components and not to pH.

TABLE 6

Inhibitory effect of 1:10 dilution of aqueous extract of *hibiscus* and penicillin on different microorganisms

| Microorganism Type | Inhibition diameter with *hibiscus* extract | Inhibition diameter with penicillin |
|---|---|---|
| *E. coli* | 11* | 13 |
| *E. coli* O157:H7 | 11 | 15 |
| Enteroinvasive *E. coli* | 10.5 | 12 |
| Enteropathogenic *E. coli* | 10 | 11 |
| Enterotoxigenic *E. coli* | 10.5 | 12 |
| *S. aureus* | 10.5 | 13 |
| *V. cholerae* O1 | 10.5 | 13 |
| *S. typhimurium* | 12 | 15 |
| *S. choleraesuis* | 11 | 12 |
| *P. aeruginosa* | 11 | 13 |
| *S. flexneri* | 10 | 12 |
| *S. sonnei* | 12 | 14 |
| *L. monocytogenes* | 10 | 12 |

*(mm)

EXAMPLE 3

Total Amount of Microorganisms in Seed and Sprout

Table 7 shows the total microorganism count in seeds and in both soybean and alfalfa sprouts before being submitted to pathogen inoculation or to a disinfection method. Because moisture content increases throughout germination, microbial contaminants residing at low levels in seeds can rapidly reach higher levels. In our results an increase up to 6 log CFU/g is observed in sprouts.

TABLE 7

Aerobic mesophilic bacteria in seed and sprout

| Plant | CFU/g* | |
|---|---|---|
| | Soybean | Alfalfa |
| Untreated seed | 2.30 ± 1.22 | 3.10 ± 1.0 |
| Untreated sprout | 8.30 ± 0.45 | 8.00 ± 0.32 |

*$Log_{10}$

Raw sprouts consumption has become an important risk factor because pathogenic microorganisms have been found, such as *Salmonella* spp., *Listeria monocytogenes, Staphylococcus aureus, Aeromonas hydrophila* (NACMCF, 1999), *Bacillus cereus* (Portnoy et al., 1973), *Klebsiella pneumoniae, Escherichia coli* O157:H7, *Shigella* and *Yersinia enterocolitica* (Park et al., 2001). These bacteria may be present in seeds or they contaminate the product during the germination of several seeds such as alfalfa, kidney bean, watercress, mustard and soybean. Some studies show that sprouts support the growth of the aforementioned pathogenic bacteria (Harmon et al., 1987; Beuchat 1996; Hera Kudo et al., 1997).

To prepare solutions, the following were used as a base:

A) The extract from dry hibiscus calyxes from the previous section

B) Sodium hypochlorite solution with 4% free hypochlorite

C) 100% glacial acetic acid

D) Sterile distilled water at pH 6

Preparation of solutions was performed as follows:

| Treatment features* |
|---|
| 1 Sterile water (control): 100 mL sterile distilled water |
| 2 1% dry *hibiscus* extract solution: 1 g of dry extract was added to 100 mL sterile distilled water. |
| 3 0.1% acetic acid solution: 0.1 mL of glacial acetic acid was added to 100 mL sterile distilled water. |
| 4 0.5% acetic acid solution: 0.5 mL of glacial acetic acid was added to 100 mL sterile distilled water. |
| 5 1% acetic acid solution: 1 mL of glacial acetic acid was added to 100 mL sterile distilled water. |
| 6 100 mg/L sodium hypochlorite solution: 0.25 mL at sodium hypochlorite solution was added to 100 mL sterile distilled water. |
| 7 1,000 mg/L sodium hypochlorite solution: 2.5 mL of sodium hypochlorite solution was added to 100 mL sterile distilled water. |
| 8 10,000 mg/L sodium hypochlorite solution: 25 mL of sodium hypochlorite solution was added to 75 mL sterile distilled water. |
| 9 1% dry *hibiscus* extract and 0.1% acetic acid solution: 1 g of dry extract and 0.1 mL of acetic acid were added to 100 mL sterile distilled water. |
| 10 1% dry *hibiscus* extract and 0.5% acetic acid solution: 1 g of dry extract and 0.5 mL of acetic acid were added to 100 mL sterile distilled water. |
| 11 1% dry *hibiscus* extract, 1% acetic acid solution: 1 g of dry extract and 1 mL of acetic acid were added to 100 mL sterile distilled water. |
| 12 1% dry *hibiscus* extract, 0.1% acetic acid, 100 mg/L hypochlorite solution: 1 g of dry extract, 0.1 mL of acetic acid and 0.25 mL of sodium hypochlorite were added to 100 mL sterile distilled water. |
| 13 1% dry *hibiscus* extract, 0.1% acetic acid, 1000 mg/L hypochlorite solution: 1 g of dry extract, 0.1 mL of acetic acid and 2.5 mL of sodium hypochlorite were added to 100 mL sterile distilled water. |
| 14 1% dry *hibiscus* extract, 0.1% acetic acid, 10,000 mg/L hypochlorite solution: 1 g of dry extract, 0.1 mL of acetic acid and 25 mL of sodium hypochlorite were added to 75 mL sterile distilled water. |
| 15 1% dry *hibiscus* extract, 0.5% acetic acid, 100 mg/L hypochlorite solution: 1 g of dry extract, 0.5 mL of acetic acid and 0.25 mL of sodium hypochlorite were added to 100 mL sterile distilled water. |
| 16 1% dry *hibiscus* extract, 0.5% acetic acid, 1000 mg/L hypochlorite solution: 1 g of dry extract, 0.5 mL of acetic acid and 2.5 mL of sodium hypochlorite were added to 100 mL sterile distilled water. |
| 17 1% dry *hibiscus* extract, 0.5% acetic acid, 10,000 mg/L hypochlorite solution: 1 g of dry extract, 0.5 mL of acetic acid and 25 mL of sodium hypochlorite were added to 75 mL sterile distilled water. |
| 18 1% dry *hibiscus* extract, 1% acetic acid, 100 mg/L hypochlorite solution: 1 g of dry extract, 1 mL of acetic acid and 0.25 mL of sodium hypochlorite were added to 100 mL sterile distilled water. |
| 19 1% dry *hibiscus* extract, 1% acetic acid, 1000 mg/L hypochlorite solution: 1 g of dry extract, 1 mL of acetic acid and 2.5 mL of sodium hypochlorite were added to 100 mL sterile distilled water. |
| 20 1% dry *hibiscus* extract, 1% acetic acid, 10,000 mg/L hypochlorite solution: 1 g of dry extract, 1 mL of acetic acid and 25 mL of sodium hypochlorite were added to 75 mL sterile distilled water. |

Calculations to adjust concentrations and mixtures are described in Table 5.

For example, in order to prepare 100 mL of 1% dry hibiscus extract, 0.1% acetic acid, 100 mg/L hypochlorite solution: 1 g of dry extract, 0.1 mL glacial acetic acid and 2.5 mL hypochlorite solution were added to 100 mL distilled water.

EXAMPLE 4

Comparison of the Antimicrobial Activity of Hypochlorite and Vegetal Extract

A comparison between the activity of aqueous extract and that of hypochlorite (1,000 and 10,000 ppm) was performed in non-inoculated seed. A total count was carried out in all cases. The results obtained are shown in Tables 9 to 11.

TABLE 8

Antimicrobial effect of aqueous extract and 1,000 ppm hypochlorite on soybean seed

| Disinfectant | Initial inoculum* | Final concentration* | Decrease* | % of decrease |
|---|---|---|---|---|
| Extract | 2.59 ± 1.19** | 2.23 ± 1.09 | 0.36 | 15.05 |
| Hypochlorite (1,000 ppm) | 2.59 ± 1.19 | 2.41 ± 1.08 | 0.18 | 6.95 |

*$Log_{10}$ CFU/g,
**= ± standard deviation, N = 3.

TABLE 9

Antimicrobial effect of aqueous extract and 1,000 ppm hypochlorite on alfalfa seed

| Disinfectant | Initial inoculum* | Final concentration* | Decrease* | % of decrease |
|---|---|---|---|---|
| Extract | 3.59 ± 0.39** | 3.20 ± 0.56 | 0.36 | 15.05 |
| Hypochlorite (1,000 ppm) | 3.59 ± 0.59 | 3.41 ± 0.38 | 0.18 | 6.95 |

*$Log_{10}$ CFU/g,
**= ± standard deviation, N = 3.

TABLE 10

Antimicrobial effect of aqueous extract and 10,000 ppm hypochlorite on soybean seed

| Solution | Initial inoculum* | Final concentration* | Decrease* | % of decrease |
|---|---|---|---|---|
| Extract | 2.31 ± 0.89** | 2.01 ± 1.06 | 0.30 | 12.99 |
| Hypochlorite (10,000 ppm) | 2.31 ± 0.89 | 1.91 ± 1.23 | 0.40 | 17.31 |

*$Log_{10}$ CFU/g,
**= ± standard deviation, N = 3.

TABLE 11

Antimicrobial effect of aqueous extract and
10,000 ppm hypochlorite on alfalfa seed

| Solution | Initial inoculum* | Final concentration* | Decrease* | % of decrease |
|---|---|---|---|---|
| Extract | 3.30 ± 0.45** | 3.01 ± 0.46 | 0.30 | 12.99 |
| Hypochlorite (10,000 ppm) | 3.31 ± 0.40 | 2.9 ± 0.56 | 0.40 | 17.31 |

*$Log_{10}$ CFU/g,
**= ± standard deviation, N = 3.

It can be observed that the antimicrobial effect of the extract is similar to that of hypochlorite at a 1,000 ppm concentration and it is smaller in comparison to 10,000 ppm hypochlorite. Nevertheless, in neither case is native flora of soybeans and alfalfa reduced to undetectable levels. In order to find an effective medium to ensure microbial safety of sprouts, a great diversity of methods have been investigated (Fett, 2006), including chemical, physical and natural antimicrobial treatments or a combination of these (Fett and Cooke, 2003). Among the solutions studied are disinfectant agents such as sodium and calcium hypochlorite, hydrogen peroxide, ethanol, carbon dioxide, potassium sorbate, calcium propionate, benzoic acid, salicylic acid, and riboflavin, among others (NACMCF, 1999).

EXAMPLE 5

Comparison of Hypochlorite's Toxic Effect and Hibiscus Aqueous Extract on Seed Germination American literature recommends the use of 10,000 ppm hypochlorite concentration to disinfect sprouts for up to 15 min to decrease the risk of pathogenic agents. This is the only chemical treatment approved by the US Environmental Protection Agency to be used on sprouts, which decreases, but does not eliminate, the number of pathogens. Thus, the potential persistent presence of microorganisms remains a hazard to consumers. A significant drawback of this treatment is that seeds undergo tissue damage, which prevents germination and, because of this, many sprout producers do not follow these recommendations.

Figure 1:
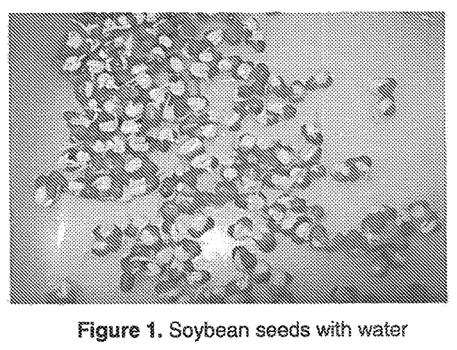
FIG. 1. Water-treated soybean seeds are shown.
Figure 2:
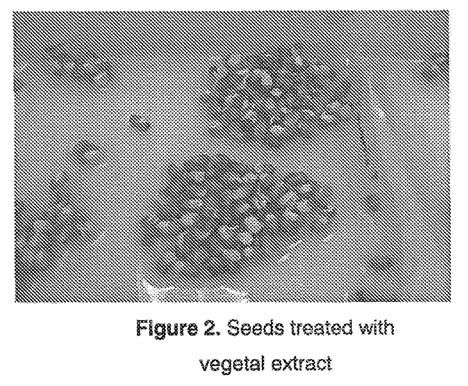
FIG. 2. Soybean seeds treated with the vegetable extract from the invention are shown.
Figure 3:
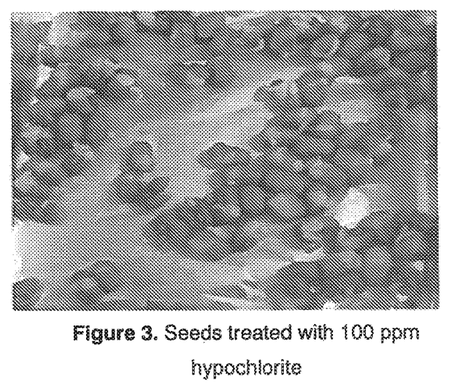
FIG. 3. Soybean seeds treated with a 100 ppm sodium hypochlorite solution are shown.
Figure 4:
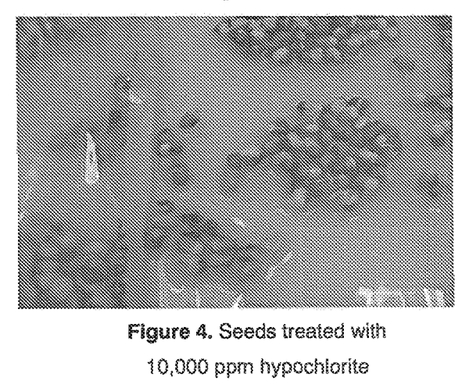
FIG. 4. Soybean seeds treated with a 10,000 ppm sodium hypochlorite solution are shown.
Figure 5:
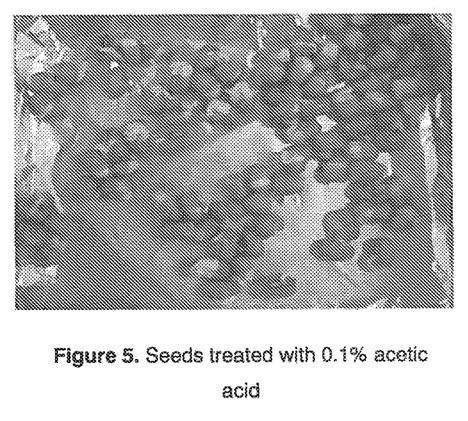
FIG. 5. Soybean seeds treated with a 0.1% w/w acetic acid solution are shown.
Figure 6:
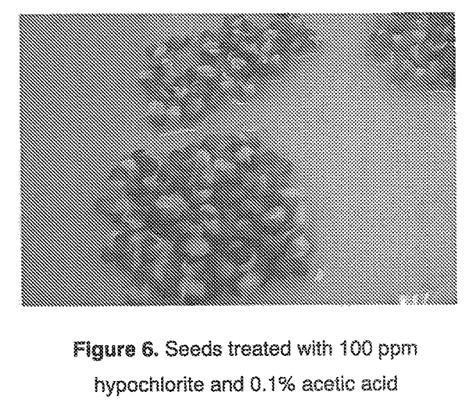
FIG. 6. Soybean seeds treated with a 100 ppm sodium hypochlorite solution and 0.1% w/w acetic acid are shown.

Therefore, a study comparing the toxic effect of hypochlorite (1,000 and 10,000 ppm), hibiscus vegetal extract and acetic acid was performed, yielding the results shown in FIGS. 1 to 6. As can be observed, seeds underwent structural damage caused by hypochlorite since they acquired a brown coloring (FIG. 4), which subsequently prevented their germination and decreased the sprout yield by 87.63%. Seeds disinfected with vegetal extract (FIG. 2) displayed no structural damage and consequently a higher germination yield was observed, similar to water-treated sprouts.

The US Environmental Protection Agency, the Food and Drug Administration (FDA) and producers of sprouts meant for human consumption all agree that treatments intended to disinfect seed must eliminate the pathogenic bacteria they contain and should not affect the viability of the treated seed by more than 20%. Additionally pathogenic bacteria should not be detected in sprouts.

Because of this, the hibiscus extract treatment for disinfecting seed in the present invention seems to be an excellent alternative that complies with the requirements laid out by sprout producers and the aforementioned agencies.

EXAMPLE 6

Evaluation of the Antimicrobial Activity of the Hibiscus Extract in Seeds, Used Alone or in Combination With Acetic Acid and Sodium Hypochlorite.

For these studies, only *Escherichia coli* O157:H7 and *S. typhimurium* were used because they are two worldwide pathogens of major interest. Antimicrobial activity of the invention's hibiscus aqueous extract was assessed in seeds inoculated with *S. typhimurium* and *E. coli* O157: H7. Results are shown in Tables 12 to 15. It is observed that the extract by itself decreases, but does not eliminate, these two pathogens in the seed. A similar effect occurred with organic acid- or hypochlorite-based treatments, which proved to be inadequate for eliminating pathogenic bacteria in seeds, except with the 10,000 ppm treatment. In the case of the 10,000 ppm treatment, it is observed that pathogenic agents were not detected in the samples analyzed from treated batches. However, they were detected (in a large amount) in sprouts, indicating that pathogenic bacteria were not actually eliminated in the seeds. This indicates that, if at least one bacterium survives the treatment, it may grow throughout seed germination, eventually reaching the detected bacterial concentrations (Tables 12 to 15). In fact, in previous studies conducted in our laboratory we observed that when seeds were inoculated with pathogenic bacteria, the bacteria were able to grow during seed germination and consequently remain in concentrations greater than 5 $log_{10}$.

Thus, treatment with 10,000 ppm hypochlorite decreases *E. coli* O157:H7 and *Salmonella* to undetectable levels in alfalfa and soy seeds. Nevertheless, if treated seeds are allowed to germinate, significant pathogen concentrations are detected in sprouts. This actually indicates that these treatments are not effective for removing pathogens from seeds.

In general, it was also observed that the hibiscus extract of the invention has a greater antimicrobial effect than hypochlorite or organic acid (tables 12 to 15). The combination of either antimicrobial agent (acid or hypochlorite) with the vegetal extract, does not completely eliminate the microorganism (Tables 12 to 15), except in some cases in which pathogens were not detected in sections of seed batches treated with the extract/organic acid mixture. But, as observed in the case of 10,000 ppm hypochlorite treatment, even if they were not detected in seed, they were detected afterwards in sprouts.

However, it was observed that the combination of the three antimicrobial agents (extract, organic acids and hypochlorite) successfully eliminates the presence of *Salmonella* sp and *E. coli* O157:H7 in alfalfa and soybean seeds (Tables 12 to 15). Moreover, in agreement with the recommendations issued by the US Environmental Protection Agency, the FDA and producers of sprouts for human consumption, the mixture fulfilling all requests mentioned by these entities is treatment no. 12 (1% dry hibiscus extract, 0.1% acetic acid and 100 mg/L hypochlorite solution). Although, preparation no.13 (1% dry hibiscus extract, 0.1% acetic acid and 1,000 mg/L hypochlorite solution) could also be considered adequate for treating seeds (Tables 12 to 15).

TABLE 12

Presence of *Salmonella* sp and germination percentage after application of different treatments to soybean seed

| Treatment | Initial concentration (without treatment) | Final concentration (after treatment) | Concentration in germinated seed | Germinated seed (%) |
|---|---|---|---|---|
| 1 | $4.5^1 \pm 0.5^2$ | 4.4 ± 0.2 | 5.2 ± 0.3 | 100 |
| 2 | 4.5 ± 0.5 | 1.6 ± 03 | 4.1 ± 0.3 | 100 |
| 3 | 4.5 ± 0.5 | 3.8 ± 0.3 | 4.3 ± 0.2 | 95 |
| 4 | 4.5 ± 0.5 | 3.2 ± 0.4 | 4.6 ± 0.1 | 85 |
| 5 | 4.5 ± 0.5 | 2.0 ± 0.3 | 4.6 ± 0.2 | 80 |
| 6 | 4.5 ± 0.5 | 4.2 ± 0.1 | 4.8 ± 0.3 | 100 |
| 7 | 4,5 ± 0.5 | 3.0 ± 0.3 | 4.6 ± 0.3 | 90 |
| 8 | 4.5 ± 0.5 | ND | 4,5 ± 0,3 | 50 |
| 9 | 4.5 ± 0.5 | 1.2 ± 0.2 | 4.6 ± 0.2 | 90 |
| 10 | 4.5 ± 0.5 | 1.0 ± 0.2 | 4.7 ± 0.3 | 85 |
| 11 | 4.5 ± 0.5 | 0.6 ± 0.2 | 4.6 ± 0.3 | 80 |
| 12 | 4.5 ± 0.5 | ND | ND | 87* |
| 13 | 4.5 ± 0.5 | ND | ND | 75 |
| 14 | 4.5 ± 0.5 | ND | ND | 40 |
| 15 | 4.5 ± 0.5 | ND | ND | 65 |
| 16 | 4.5 ± 0.5 | ND | ND | 60 |
| 17 | 4.5 ± 0.5 | ND | ND | 40 |
| 18 | 4.5 ± 0.5 | ND | ND | 50 |
| 19 | 4.5 ± 0.5 | ND | ND | 40 |
| 20 | 4.5 ± 0.5 | ND | ND | 30 |

[1] $\log_{10}$ CFU/g (mean value from 3 repetitions);
[2] standard deviation;
ND: not detected;
*the least amount of seeds that should germinate after disinfection treatment is 85%.

TABLE 13

Presence of *E. coli* O157:H7 and germination percentage after application of different treatments to soybean seed

| Treatment | Initial concentration (without treatment) | Final concentration (after treatment) | Concentration in germinated seed | Germinated seed (%) |
|---|---|---|---|---|
| 1 | $4.2^1 \pm 0.3^2$ | 4.3 ± 03 | 5.2 ± 0.3 | 100 |
| 2 | 4.2 ± 0.3 | 1.1 ± 0.2 | 5.1 ± 0.3 | 100 |
| 3 | 4.2 ± 0.3 | 3.2 ± 0.3 | 5.3 ± 0.3 | 95 |
| 4 | 4.2 ± 0,3 | 3.0 ± 0.4 | 5.6 ± 0.2 | 85 |
| 5 | 4.2 ± 0.3 | 2.0 ± 0.2 | 5.6 ± 0.2 | 80 |
| 6 | 4.2 ± 0.3 | 3.8 ± 0.3 | 5.8 ± 0,3 | 100 |
| 7 | 4.2 ± 0.3 | 2.8 ± 0.3 | 5.6 ± 0.2 | 90 |
| 8 | 4.2 ± 0.3 | ND | 5.5 ± 0.3 | 50 |
| 9 | 4.2 ± 0.3 | 1.0 ± 0.1 | 5.6 ± 0.3 | 90 |
| 10 | 4.2 ± 0.3 | 0.8 ± 0.2 | 5.7 ± 0.2 | 85 |
| 11 | 4.2 ± 0.3 | 0.6 ± 0.2 | 5.6 ± 0.3 | 80 |
| 12 | 4.2 ± 0.3 | ND | ND | 87* |
| 13 | 4.2 ± 0.3 | ND | ND | 75 |
| 14 | 4.2 ± 0.3 | ND | ND | 40 |
| 15 | 4.2 ± 0.3 | ND | ND | 65 |
| 16 | 4.2 ± 0.3 | ND | ND | 60 |
| 17 | 4.2 ± 0.3 | ND | ND | 40 |
| 18 | 4.2 ± 0.3 | ND | ND | 50 |
| 19 | 4.2 ± 0.3 | ND | ND | 40 |
| 20 | 4.2 ± 0.3 | ND | ND | 30 |

[1] $\log_{10}$ CFU/g (mean value from 3 repetitions);
[2] standard deviation;
ND: not detected;
*the least amount of seeds that should germinate after disinfection treatment is 85%.

TABLE 14

Presence of *Salmonella* sp and germination percentage after application of different treatments to alfalfa seed

| Treatment | Initial concentration (without treatment) | Final concentration (after treatment) | Concentration in germinated seed | Germinated seed (%) |
|---|---|---|---|---|
| 1 | $3.5^1 \pm 0.3^2$ | 3.4 ± 0.2 | 5.2 ± 0.2 | 100 |
| 2 | 3.5 ± 0.3 | 1.4 ± 0.3 | 5.1 ± 0.3 | 100 |
| 3 | 3.5 ± 0.3 | 2.8 ± 0.3 | 5.3 ± 0.3 | 100 |
| 4 | 3.5 ± 0.3 | 2.2 ± 0.4 | 5.6 ± 0.3 | 90 |
| 5 | 3.5 ± 0.3 | 1.0 ± 0.2 | 5.6 ± 0.4 | 80 |
| 6 | 3.5 ± 0,3 | 2.2 ± 0.3 | 5.8 ± 0.2 | 100 |
| 7 | 3.5 ± 0.3 | 1.0 ± 0.3 | 5.6 ± 0.2 | 90 |
| 8 | 3.5 ± 0.3 | ND | 5.5 ± 0,3 | 60 |
| 9 | 3.5 ± 0.3 | 1.0 ± 0.3 | 5.6 ± 0.2 | 90 |
| 10 | 3.5 ± 0.3 | 0.8 ± 0.2 | 5.7 ± 0.3 | 80 |
| 11 | 3.5 ± 0.3 | ND | 5.6 ± 0.2 | 70 |
| 12 | 3.5 ± 0.3 | ND | ND | 90* |
| 13 | 3.5 ± 0.3 | ND | ND | 80 |
| 14 | 3.5 ± 0.3 | ND | ND | 50 |
| 15 | 3.5 ± 0.3 | ND | ND | 70 |
| 16 | 3.5 ± 0.3 | ND | ND | 60 |
| 17 | 3.5 ± 0.3 | ND | ND | 40 |
| 18 | 3.5 ± 0.3 | ND | ND | 60 |
| 19 | 3.5 ± 0.3 | ND | ND | 40 |
| 20 | 3.5 ± 0.3 | ND | ND | 30 |

[1] $\log_{10}$ CFU/g (mean of 3 repetitions);
[2] standard deviation;
ND: not detected;
*the least amount of seeds that should germinate after disinfection treatment is 85%.

TABLE 15

Presence of *E. coli* O157:H7 and germination percentage after application of different treatments to alfalfa seed

| Treatment | Initial concentration (without treatment) | Final concentration (after treatment) | Concentration in germinated seed | Germinated seed (%) |
|---|---|---|---|---|
| 1 | $3.2^1 \pm 0.4^2$ | 3.0 ± 0.3 | 5.3 ± 0.4 | 100 |
| 2 | 3.2 ± 0.4 | 1.1 ± 0.2 | 5.2 ± 0.3 | 100 |
| 3 | 3.2 ± 0.4 | 2.2 ± 0.4 | 5.1 ± 0.2 | 100 |
| 4 | 3.2 ± 0.4 | 2.0 ± 0.3 | 5.4 ± 0.3 | 90 |
| 5 | 3.2 ± 0.4 | 1.0 ± 0.3 | 5.5 ± 0.4 | 80 |
| 6 | 3.2 ± 0.4 | 2.8 ± 0.3 | 5.5 ± 0.3 | 100 |
| 7 | 3.2 ± 0.4 | 1.8 ± 0.4 | 5,5 ± 0,3 | 90 |
| 8 | 3.2 ± 0.4 | ND | 5.4 ± 0.3 | 60 |
| 9 | 3.2 ± 0.4 | 0.8 ± 0.3 | 5.5 ± 0.4 | 90 |
| 10 | 3.2 ± 0.4 | 0.6 ± 0.3 | 5.2 ± 0.3 | 80 |
| 11 | 3.2 ± 0.4 | 0.6 ± 0.3 | 5.4 ± 0.3 | 70 |
| 12 | 3.2 ± 0.4 | ND | ND | 90* |
| 13 | 3.2 ± 0.4 | ND | ND | 80 |
| 14 | 3.2 ± 0.4 | ND | ND | 50 |
| 15 | 3.2 ± 0.4 | ND | ND | 70 |
| 16 | 3.2 ± 0.4 | ND | ND | 60 |
| 17 | 3.2 ± 0.4 | ND | ND | 40 |
| 18 | 3.2 ± 0.4 | ND | ND | 60 |
| 19 | 3.2 ± 0.4 | ND | ND | 40 |
| 20 | 3.2 ± 0.4 | ND | ND | 30 |

[1] $\log_{10}$ CFU/g (mean value from 3 repetitions);
[2] standard deviation;
ND: not detected;
*the least amount of seeds that should germinate after disinfection treatment is 85%.

It should be noted, the importance of removing pathogens from seeds without detecting them in sprouts. In 1999, 157 *Salmonella* spp. outbreaks linked to consumption of raw alfalfa sprouts were detected in the USA, even though these seeds were disinfected using 10,000 ppm calcium hypochlorite before germination (Proctor et at, 2001). In 2001, another *Salmonella* sp outbreak was linked to the consumption of the same type of sprouts, resulting in 22 detected cases (Outbreak Alert Database, 2005). Later, in 2004, there was a *Salmonella bovismorbificans* outbreak in alfalfa sprouts; 35 cases were reported. In the same year, an *E. coli* O157:H7 outbreak linked to the consumption of alfalfa sprouts was reported in a food establishment, in which 2 cases were detected (Outbreak Alert Database, 2005).

In the present invention, only the combination of three antimicrobials results in complete removal of pathogens from seed, which is an example of what is currently known as a multiple barrier approach (Knochel and Gould, 1995). Multiple barriers are a combination of less severe treatments, resulting in stable, secure and safe food.

Based on this, the compositions of the present invention are an excellent alternative for disinfection and/or food preservation (e.g. fresh food) without altering the food's nutritional properties, In this regard, the compositions described herein allow for effective pathogen disinfection in seeds and sprouts, allowing the safe consumption of such products.

REFERENCES

1. Adams M. R. (1997). Microbiología de los alimentos. Editorial Acribia S. A.
2. Andrew, W. H., Mislivec, P. B., Wilson, C. R., Bruce, V. R., Poelma, P. L., Gibson, R., Trucksess, M. W. and Young, K. (1982). Microbial Hazards Associated with Bean Sprouting. J. Assoc. Off. Anal. Chem. 65 (2): 241-248.
3. Aytac, S. A., and Gorris, L. G. M. (1994). Survival of *Aeromona hydrophila* and *Listeria monocytogenes* on fresh vegetables stored under moderate vacum. Abstract. World J. Microbiol. Biotechnol. 10 (6): 670-672.
4. Aureli, P., Costantini, A., and Zolea, S. (1992). Antimicrobial activity of some plant essential oils against *Listeria monocytogenes*. J. Food Prot. 55: 344-348.
5. Badui, D. S. (1993). Química de los alimentos. 4º edición Pearson, España.
6. Beuchat, L. R. (1996). Pathogenic microorganisms associated with fresh produce. J. Food Prot. 59:204.216.
7. Beuchat, L. R. (1999). Survival of enterohemorrhagic *Escherichia coli* O157:H7 in bovine faeces applied to lettuce and the effectiveness of chlorinated water as a disinfectant. J. Food Prot. 62: 845-849.
8. Beuchat, L. R. (1997). Comparison of chemical treatments to kill *Salmonella* on alfalfa seeds destined for sprout production. Int. J. Food Microbiol. 34 (3): 329-333
9. Brown, K. L. and Oscroft, C. A. (1989). Guidelines for the hygienic manufacture, distribution and retail sale of sprouted seeds with particular reference to mung beans. Campden & Choreleywood Food Reasearch Association.
10. Bryan, F L. (1977). Diseases transmitted by food contaminated by wastewater. J. Food Prot. 40:45-56.
11. Castro-Rosas, J. and Escartin, E. F. (2000). Survival and growth of *Vibrio cholerae* O1, *Salmonella typhi* and *Escherichia coli* O157:H7 in alfalfa sprouts. Journal of Food Science. 65 (1): 162-165.
12. CDC. Centers for Disease Control and Prevention (1993). Update: Cholera-Western Hemisphere. Morbid Mortal Weekly Rep. 42:89-91.
13. Fernández, E. E. (1997), Manual de Curso de Microbiología Sanitaria de Agua y Alimentos. D.I.P.A. Facultad de Química. Universidad Autónoma de Querétaro. México.
14. Fett, W F. (2006). Interventions to ensure the microbial safety of sprouts. In: Sapers G M, Gorny J R, Yousef A E, editors. Microbiology of fruits and vegetables, New York, Taylor & Francis. 187-209.
15. Fett, W F. and Cooke, P. (2003). Reduction of *Escherichia coli* O157:H7 and *Salmonella* on laboratory-inoculated alfalfa seed with commercial citrus-related products. J Food Prot. 66:1158-65.
16. Flippim, R. S. and Mickelson, M. N. (1960). Use of *Salmonellae* antagonists in fermenting egg white. I. Microbial antagits of *Salmonellae*. Appl. Microbial. 8: 366-370.
17. Frazier, W. C., Westhoff, D. C. 1991. Microbiología de los Alimentos. Tercera Edición. Editorial Acribia, S. A. Zaragoza, Spain.
18. Geiges, O., Stahlin, B., Baumann, B. (1990). Microbiological evaluation of prepared salad vegetables and sprouts. Archiv Fur Lebensmittel Hygiene 81, 684-721.
19. Gilliland, S. E. and Speck, M. L. (1972). Interactions of food starter cultures and food borner pathogens: lactic *streptococci* versus *staphylococci* and *Salmonella*. J. Food Milk Technol. 35: 307-310.
20. Gilliland, S. E. and Speck, M. L. (1977). Antagonistic action of *Lactobacillus acidophilus* toward intestinal and food borne pathogens in associative cultures. J. Food Prot, 40: 820-823.
21. Hara-Kudo, Y., Iwaki, M., Kasuga, F., Sugita-Konishi, Y. and Kumagai, S. (1997), Potential hazard of radish sprout as a vehicle of *Escherichia coli* O157:H7. J. Food Prot. 60:1125-1127.
22. Harmon, S. M., Kautter, D. A. and Solomon, H. M. (1987). *Bacillus cereus* contamination of seeds and vegetables sprouts grown in home sprouting kit. J. Food Prot. 50:62-65.
23. Hwei-Ming, B., Villaume C., Jean-Pierre N. and Luc, M. (1997). Effect of germination on chemical composition, biochemical constituents and antinutritional factors of soya bean (Glycine max) seeds. J Sci Food Agric.
24. Jaquette, C. B., Beuchat, L. R. and Mahon, B. E. (1996). Efficacy of chlorine and heat treatment in killing *Salmonella stanley* inoculated onto alfalfa seeds and growth and survival of the pathogen during sprouting and storage. Appl. Environ. Microbiol, 62: 2212-2215
25. Kandil, O., Radwan, N. M., Hassan, A. B., Amer, A. M. M., El-Banna, H. A. and Amer, W. M. M. (1994). Extracts and fractions of *Thymus capitatus* exhibit antimicrobial activities. Journal of Ethnopharmacology. 44: 19-24.
26. Klaus, L. (1980). Cereal sprouts: composition, nutritive value, food aplications. Food Sci. Nutr. 13: 353-385.
27. Konowalchuk, J. and Speirs, J. I. (1974). Recovery of coxsackievirus B5 from stored lettuce. J. Milk Food Technol. 37: 132-134
28. Lairon, D., Cara, L., Gauthier, J., Orsetti, A., Bon, R., Bon, J., Ravel, M., Chauvin, C. (1992). Effets de l'ingestion de riz complet germe' sur des parame'tres me'taboliques et nutritionnels chez l'homme. Rept. Institut National Scientique de la Recherche Me'dicale, France.
29. Lang, M., Ingham, B. H. and Ingham, S. C. (2000). Efficacy of novel organic acid and hypochlorite treatments for eliminating *Escherichia coli* O157:H7 from alfalfa seeds prior to sprouting. Int J Food Microbiol. 58:73-82.
30. Lis-Balchin, M., Hart, S., Deans, S. G. and Eagle-Sham, E. (1996). Comparison of the pharmacological and antimicrobial action of commercial plant essential oils. Journal of Herbs Spices and Medicinal Plants. 4: 69-86.

31. Moline, H. E. (1999). US Department of Agriculture, Agriculture Research Service, Beltsville Agricultural Research Center. Personnel communication.
32. [NACMCF] Natl (1999). Advisory Committee on Microbiological Criteria for Foods. Microbiological safety evaluations and recommendations on sprouted seeds. Int J Food Microbiol 52:123-53.
33. Naito, S., Okada, Y. and Sakai, T. (1989). Studies on utilization of ozone in food preservation. V. Changes in microflora of ozone treated cereals, grain, peas, beans and spices during storage. Journal of Japanese Society of Food Science and Technology. 35: 69-77.
34. Okuda, S., Aoki, M., Kikuno, R., Nishimura, T. and Nagumo, T. (1994). Preparation of germ-free bean sprout and identification of bacteria associated with their putrefaction. Abstract, J. Antibact. Antifung. Ag. Jap. 22 (12): 711-715.
35. Park, C. E. and Sanders, G. W. (1990). Source of *Klebsiella pneumoniae* in Alfalfa and Mung Bean Sprouts and Attempts to Reduce its Occurrence. Can. int. Food Sci. Technol. J. 23: 189-192.
36. Park, C. M., Hung, Y. C., Doyle, M. P., Ezeike, G. O. and Kim, C. (2001). Pathogen reduction and quality of lettuce treated with electrolyzed oxidizing and acidified chlorinated water. J Food Sci 66:1368-72.
37. Paster, N., Juven, B. J., Shaaya, E., Menasherov, M., Nitzan, R., Wesslowicz, H., and Ravid, U. (1990). Inhibitory effect of oregano and thyme essential oils on moulds and foodborne bacteria. Letter in Applied Microbiology. 11: 33-37.
38. Patterson, J. E. and Woodburn, M. J. (1980). *Klebsiella* and other bacteria on alfalfa and bean sprouts at the retail level. Journal of Food Science. 45: 492-495.
39. Piernas, V. and Guiraud, J. P. (1997). Disinfection of rice seeds prior to sprouting. Journal of Food Science. 82: 611-615.
40. Portnoy, B. L., Goepfert, J. M. and Harmon, S. M. (1973). An outbreak of *Bacillus cereus* food poisoning resulting from contaminated vegetable sprouts. Am. J. Epidemiol. 103: 589-594.
41. Proctor, M. E., Hamacher, M., Tortorello, M. L., Archer, J. R. and Davis, J. P. (2001). Multistate outbreak of *Salmonella* serovar Muenchen infections associated with alfalfa sprouts grown from seeds pretreated with calcium hypochlorite. J Clin Microbiol 39:3461-5.
42. Rajkowski, K., Boyd, G. and Thayer, D. (2003). Irradiation D-values for *Escherichia coli* O157:H7 and *Salmonella* spp. on inoculated broccoli seeds and effects of irradiation on broccoli sprout keeping quality and seed viability. J Food Prot. 66: 760-6.
43. Roller, S. (2003). Natural Antimicrobials for the Minimal Processing of Foods. Woodhead Publishing. Cambridge, England.
44. Singh, N. and Bhunia A. K. (2003). Sequential disinfection of *Escherichia coli* O157:H7 inoculated alfalfa seeds before and during sprouting using aqueous chlorine dioxide, ozonated water, and thyme essential oil. Swiss Society of Food Science and Technology. 38: 235-243.
45. Sistema Nacional de Vigilancia Epidemiológica. (1997). Epidemiología. Sistema único de información. México. 14(50):7-13.
46. Smith-Palmer, A., Stewart, J., and Fyfe, L. (1998). Antimicrobial properties of plant essential oils against five important foodborne pathogens. Letters in Applied Microbiology. 26, 118-122.
47. Splittstoesser, D. F., Queale, D. T. and Andaloro, B. W. (1983). The microbiology of vegetable sprouts during commercial production. Journal of Food Safety. 5: 79-86.
48. Taormina, P. J. and Beuchat, L. R. (1999). Comparison of chemical treatments to eliminate enterohemorrhagic *Escherichia coli* O157:H7 on alfalfa seeds. J. Food Prot. 62:318-324.
49. Whyte, K. C. (1973). The Complete Sprouting Cookbook, Troubador Press. Food Sci. Nutr. 13: 353-385.
50. Young, V. R., Scrimshaw, N. S., Torun, B. and Viteri, F. (1979), Soybean protein in human nutrition: an overview. J AOCS. 56: 110-120.

The invention claimed is:
1. A method for disinfecting contaminated seeds comprising applying an effective amount of a composition to seeds in need thereof, wherein said composition comprises:
 (a) 1% *hibiscus sabdariffa* L. calyxes extract;
 (b) 0.1% acetic acid
 (c) 0.1 to 1.0% sodium hypochlorite,
 wherein the seeds are contaminated with foodborne bacteria selected from the group consisting of *salmonella* and *E. coli* O157:H7,
 wherein the seeds are 70 to 90% germinated, and
 wherein the composition is administered to the seeds to effectively eliminate the contamination and obtain sprouts without the foodborne bacteria.

* * * * *